(12) United States Patent
Ulupinar et al.

(10) Patent No.: US 8,824,305 B2
(45) Date of Patent: Sep. 2, 2014

(54) PAGING SCHEMES FOR LOCAL NETWORK ACCESS

(75) Inventors: Fatih Ulupinar, San Diego, CA (US); Parag A. Agashe, San Diego, CA (US); Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 12/498,797

(22) Filed: Jul. 7, 2009

(65) Prior Publication Data

US 2010/0008234 A1 Jan. 14, 2010

Related U.S. Application Data

(60) Provisional application No. 61/079,381, filed on Jul. 9, 2008.

(51) Int. Cl.
*H04W 52/00* (2009.01)
*H04W 68/02* (2009.01)

(52) U.S. Cl.
CPC .............. *H04W 52/00* (2013.01); *H04W 68/02* (2013.01)
USPC .......................... 370/241; 370/310; 455/426.1

(58) Field of Classification Search
CPC ............................ H04W 52/216; H04W 68/00
USPC ........................................ 455/426.1; 370/241
See application file for complete search history.

(56) References Cited

U.S. PATENT DOCUMENTS 5,570,366 A 10/1996 Baker et al.
5,617,421 A 4/1997 Chin et al.

(Continued)

FOREIGN PATENT DOCUMENTS

CA 2137587 C 3/1999
CN 101420750 A 4/2009

(Continued)

OTHER PUBLICATIONS

Ericsson, "On Local IP Access", 3GPP Draft, S2-094051_LIPA PA7, 3rd Generation Partnership Project (3GPP), Mobile Competence Centre, 650, Route Des Lucioles, F-06921 Sophia-Antipolis Cedex, France, no. Tallinn, May 13, 2009, XP050347032 the whole document.

(Continued)

*Primary Examiner* — Jason Mattis
*Assistant Examiner* — Stephen J Clawson
(74) *Attorney, Agent, or Firm* — François A. Pelaez

(57) ABSTRACT

Paging and power consumption are managed in conjunction with providing local breakout in a wireless wide area network. In some aspects, if a packet destined for an access terminal is received at an access point that provides local breakout, the access point may inform the network so that the network will cause the access point to page the access terminal. Alternatively, in some aspects an access point that provides local breakout may maintain idle context of the access terminal, whereby the access point may autonomously page the access terminal (i.e., without involving the core network). In some aspects local breakout traffic is filtered at an access point to reduce the number of pages or packets sent to an access terminal. In some aspects an indication of a packet type is provided with a page message to enable an access terminal to determine whether to receive the packet. In some aspects a local link interface may be selectively disabled or enabled to limit traffic at an access terminal.

45 Claims, 16 Drawing Sheets

(56) References Cited

U.S. PATENT DOCUMENTS

| | | | |
|---|---|---|---|
| 2001/0038626 A1 | 11/2001 | Dynarski et al. | |
| 2004/0042479 A1 | 3/2004 | Epstein et al. | |
| 2004/0052238 A1 | 3/2004 | Borella et al. | |
| 2004/0087320 A1* | 5/2004 | Kim et al. | 455/458 |
| 2004/0157603 A1* | 8/2004 | Hurtta et al. | 455/434 |
| 2005/0097223 A1 | 5/2005 | Shen et al. | |
| 2005/0197125 A1 | 9/2005 | Kang et al. | |
| 2005/0276237 A1* | 12/2005 | Segal et al. | 370/312 |
| 2006/0014550 A1 | 1/2006 | Ryu et al. | |
| 2007/0105568 A1 | 5/2007 | Nylander et al. | |
| 2007/0201467 A1* | 8/2007 | Kakani | 370/390 |
| 2007/0211745 A1* | 9/2007 | Deshpande et al. | 370/432 |
| 2007/0249347 A1 | 10/2007 | Saifullah et al. | |
| 2007/0264955 A1 | 11/2007 | Tsai et al. | |
| 2008/0014253 A1 | 1/2008 | Jorgensen et al. | |
| 2008/0123527 A1 | 5/2008 | Shahidi et al. | |
| 2008/0146253 A1 | 6/2008 | Wentink | |
| 2008/0220769 A1 | 9/2008 | Qi et al. | |
| 2008/0220770 A1 | 9/2008 | Qi et al. | |
| 2009/0023453 A1* | 1/2009 | Hu et al. | 455/452.1 |
| 2010/0008341 A1 | 1/2010 | Ulupinar et al. | |
| 2010/0103829 A1 | 4/2010 | Murzeau et al. | |
| 2010/0195621 A1 | 8/2010 | Kekki et al. | |

FOREIGN PATENT DOCUMENTS

| | | | |
|---|---|---|---|
| EP | 1596616 A1 | 11/2005 | |
| JP | 2003501980 A | 1/2003 | |
| JP | 2003529954 | 10/2003 | |
| JP | 2004135293 | 4/2004 | |
| JP | 2009529301 A | 8/2009 | |
| KR | 100827137 B1 | 5/2008 | |
| RU | 2262196 | 10/2005 | |
| RU | 2327286 C1 | 6/2008 | |
| WO | WO-0072615 A1 | 11/2000 | |
| WO | WO0078086 | 12/2000 | |
| WO | WO-2005086379 A1 | 9/2005 | |
| WO | WO-2007040449 A1 | 4/2007 | |
| WO | WO-2007103888 A1 | 9/2007 | |
| WO | 2007134216 A1 | 11/2007 | |
| WO | 2008132163 | 11/2008 | |

OTHER PUBLICATIONS

Tallinn, May 13, 2009, XP050347032 the whole document
Alcatel-Lucent: "On architecture for LIPA for HNB and HeNB" 3GPP Draft; S2-093169, HNB LIPA Architecture 3G-EUTRAN-V3_Clean, 3rd Generation Partnership Project (3GPP), Sophia-Antipolis Cedex; France, Tallinn, Estonia, May 11-15, 2009, XP050346264.
International Search Report and Written Opinion—PCT/US2009/050164, International Search Authority—European Patent Office—Nov. 27, 2009.
Marco Liebsch, et al., "Paging and power saving in IEEE 802.11-enabled networks—a simulative study" MSWIM'06, Oct. 2, 2006,-Oct. 6, 2006 pp. 78-85, XP002555532.
Nortel: "LTE Local Breakout for Home eNB" 3GPP Draft; R3-081247-INTHENB-10.1.2A-LTEHENBDEP.REVO, 3rd Generation Partnership Project (3GPP), Mobile Competence Centre ; 650, Route Des Lucioles ; F-06921 Sophia-Antipolis Cedex; France, vol. RAN WG3, no. Kansas City, USA; Apr. 30, 2008, XP050164427.
Sunghyun Choi., et al., "Normative Text Proposal for WLAN Paging and Idle Mode" IEEE 802.11-06/0943R2, Jul. 1, 2006, XP008109950.
Vodafone: "Paging Initiation from UPE or from eNodeB?—text proposal for TR23.882" 3GPP Draft; S2-060178, 3rd Generation Partnership Project (3GPP), Sophia-Antipolis Cedex, France, Budapest, Hungary, Jan. 16-20, 2006, XP050254542.
Taiwan Search Report—TW098123240—TIPO—Sep. 13, 2012.

* cited by examiner

PAGING SCHEMES FOR LOCAL NETWORK ACCESS

CLAIM OF PRIORITY

This application claims the benefit of and priority to commonly owned U.S. Provisional Patent Application No. 61/079,381, filed Jul. 9, 2008, the disclosure of which is hereby incorporated by reference herein.

CROSS-REFERENCE TO RELATED APPLICATION

This application is related to concurrently filed and commonly owned U.S. patent application Ser. No. 12/498,785, entitled "PAGING AND POWER MANAGEMENT SCHEMES FOR LOCAL NETWORK ACCESS," the disclosure of which is hereby incorporated by reference herein.

BACKGROUND

1. Field

This application relates generally to wireless communication and more specifically, but not exclusively, to facilitating efficient local access.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home) to provide more robust indoor wireless coverage to mobile access terminals. Such small-coverage base stations may be referred to as access point base stations, Home eNodeBs ("HeNBs"), or home femtos. Typically, such small-coverage base stations are connected to the Internet and the mobile operator's network via a DSL router or a cable modem.

In some cases, one or more local services may be deployed at the same location as a small-coverage base station. For example, a user may have a home network that supports a local computer, a local printer, a server, and other components. In such cases, it may be desirable to provide access to these local services via the small-coverage base station. For example, a user may wish to use his or her cell phone to access a local printer when the user is at home.

In general, an Internet-enabled access terminal may not be able to communicate with a device on a home network because this device is protected by a firewall and the network address translation ("NAT") within the home router and the access terminal appears as a node on the public Internet from the perspective of the home network. There are methods to enable limited access to some home devices by using port forwarding, however, this requires detailed technical knowledge about the devices, the associated applications and the home router equipment, which may be considered beyond the capabilities of a wireless access terminal user. Accordingly, a need exists for efficient and effective methods for accessing local services.

SUMMARY

A summary of sample aspects of the disclosure follows. It should be understood that any reference to the term aspects herein may refer to one or more aspects of the disclosure.

The disclosure relates in some aspects to managing paging and power consumption in conjunction with providing access to local services in a wireless wide area network. For example, an access terminal that is deployed in a mobile network (e.g., a cellular network) may access such a local service when the access terminal is being served by an access point (e.g., a HeNB) that provides local network access (also known as local breakout).

The disclosure relates in some aspects to enabling an access terminal to be paged if a local breakout packet destined for the access terminal is received at an access point. In some implementations, upon receipt of such a packet, the access point informs a network paging management entity (e.g., of the core operator network) so that this entity will cause the access point to page the access terminal. Alternatively, in some implementations the access point may maintain idle context of the access terminal, whereby the access point may autonomously page the access terminal (i.e., without involving a network paging management entity). In this way, the network may be relieved of paging-related operations for local breakout.

The disclosure relates in some aspects to filtering local breakout traffic to reduce the number of pages or packets sent to an access terminal. In some implementations an access point that provides local breakout for an access terminal may filter certain local breakout packets destined for the access terminal. For example, upon receipt of a non-unicast packet, the access point may not page that access terminal (if the access terminal is in idle mode) or the access point may not deliver the packet to that access terminal (if the access terminal is in active mode). In some implementations, an access point that provides local breakout may selectively filter local breakout packets destined for the access terminal based on the current operating mode of the access terminal. For example, an election may be made at the access terminal (e.g., by a user or an application) as to whether non-unicast packet are to be delivered to the access terminal, whereupon an indication of this election (e.g., the current operating mode of the access terminal) is sent to the access point.

The disclosure relates in some aspect to providing an indication of a packet type when paging an access terminal to enable the access terminal to decide whether to receive the packet. Here, upon receipt of a local breakout packet destined for the access terminal, the access point determines a type of the packet and includes an indication of this type when paging the access terminal. Upon receipt of this page, the access terminal may decide whether to receive this packet (e.g., decide whether to switch to active mode and contact the access point to receive the packet).

The disclosure relates in some aspect to reducing traffic load associated with local breakout by selectively disabling or enabling a local link interface. For example, the link interface may be temporarily disabled if the local link has been idle for a defined period of time.

BRIEF DESCRIPTION OF THE DRAWINGS

These and other sample aspects of the disclosure will be described in the detailed description and the appended claims that follow, and in the accompanying drawings, wherein:

Figure 1:
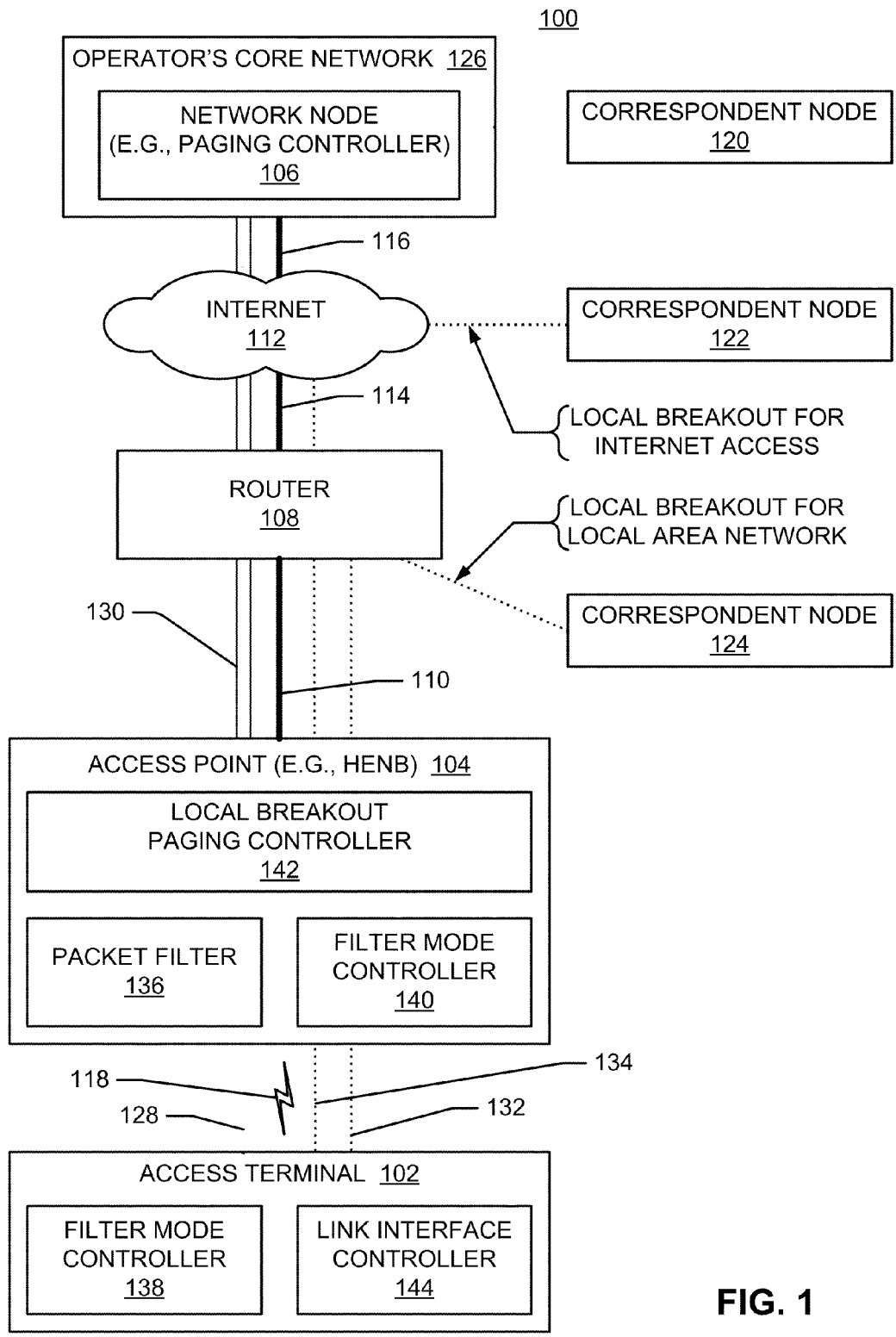
FIG. 1 is a simplified block diagram of several sample aspects of a communication system where paging and power consumption are managed in conjunction with providing local breakout.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a wireless wide area network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, eNodeBs, or HeNBs, while access terminals may be referred to or implemented as user equipment or mobile stations, and so on.

Access points in the system 100 provide one or more services (e.g., network connectivity) for one or more wireless access terminals that may be installed within or that may roam throughout the coverage area of the access points. For example, at various points in time an access terminal 102 may connect to an access point 104. To reduce the complexity of FIG. 1, only a single access point 102 and a single access terminal 104 are shown.

Each of the access points in the system 100 may communicate with one or more network nodes (represented, for convenience, by network node 106) to facilitate wide area network connectivity. A network node may take various forms such as, for example, one or more core network entities (e.g., an operation, administration, and maintenance server, a mobility management entity, or some other suitable network entity).

The nodes in the system 100 may employ various means to communicate with one another. In the example of FIG. 1, the access point 104 may connect to a router 108 as represented by a communication link 110, the router 108 may connect to the Internet 112 as represented by a communication link 114, and the network node 106 may connect to the Internet 112 as represented by a communication link 116. In addition, the access terminal 102 communicates with the access point 104 via an air interface link 118 (as represented by the RF symbol).

Through the use of these communication links, the access terminal 104 may communicate with various correspondent nodes (e.g., nodes 120, 122, and 124) in the system 100. In some aspects, access to these different correspondent nodes may be referred to herein as involving network access or local breakout access.

For example, network access relates in some aspects to a service accessed via an operator's core network (e.g., the core network of a cellular network). That is, an access terminal may access network services in a similar manner as when the access terminal is connected to a macro network (e.g., connected to a macro base station of a wireless operator's network). In the example of FIG. 1, access to the correspondent node 120 (e.g., another access terminal) may thus be defined as a network (non-local) service since this node is accessed via the operator's core network 126. Traffic flow between the access terminal 102 and the correspondent node 120 (e.g., via links 118, 110, 114, and 116) is represented by dotted line 128. Typically, this traffic is routed between the access point 104 and the operator's core network 126 (e.g., an IP gateway for the access terminal 102 in the core network 126) via a protocol tunnel (e.g., an IPsec tunnel) as represented by a pair of lines 130.

Local breakout access relates in some aspects to accessing a local service without going through an operator's core network. For example, an access terminal may access certain services when the access terminal is at a home network or some other local network. Advantageously, by bypassing the operator's core network, latency (e.g., response times for an access terminal) may be improved and resources on the operator network may be conserved (e.g., by off-loading traffic from the operator's core network).

Local service may take various forms. In some implementations local service may relate to services provided by entities on a local network. For example, the correspondent node 124 may represent a device that resides on the same IP subnetwork as the access point 104 (e.g., a local area network served by the router 108). In this case, accessing a local network service may involve accessing a local printer, a local server, a local computer, another access terminal, or some other entity on the IP subnetwork. In FIG. 1, traffic (e.g., packet) flow between the access terminal 102 and the correspondent node 124 is represented by dashed line 132. The line 132 illustrates that the access terminal 102 may access this local service via the access point 104 and the router 108 (i.e., via links 118 and 110) without going through the operator's core network 126.

In some implementations a local service may relate to a node that is connected to some other network (e.g., correspondent node 122 connected to the Internet 112). For example, the router 108 may provide an Internet connection to an Internet service provider ("ISP") and the access terminal 102 may use this Internet connection to access service provided by the node 122 (e.g., a web server). Accordingly, through the use of local IP access, different access terminals in a network may be provided with Internet access at certain locations (e.g., a user's home, an employer's facility, an Internet hotspot, etc.) without accessing the wireless operator's core network. Traffic flow between the access terminal 102 and the correspondent node 122 (e.g., via links 118, 110, and 114) is represented by dashed line 134 in FIG. 1.

The use of local breakout raises several issues which may affect system performance. First, an access terminal may need to be paged to deliver packets that do not arrive via the operator's core network. However, conventional operator networks are designed to handle paging at the core network (e.g., the idle context for paging the access terminal is maintained within the core network). Second, there may be a significant number of messages associated with local traffic. Thus, the battery life of an access terminal may be significantly reduced if the access terminal needs to wake from idle mode to process these messages. However, access terminals are typically wireless battery operated devices that are expected by the users to have a long battery life when left idle.

With respect to managing paging, in a typical wireless network (e.g., 1xEvDO, UMB, UMTS, HSPA, LTE, WiMAX), an access terminal is paged only to send a packet flowing through the operator's core network. This allows the operator to consolidate paging functionality of the access terminal in a core network element (e.g., a mobility management entity, MME, in LTE). This core network element is the only entity which keeps detailed information on how and when to page an access terminal, as access terminals maintain a strict sleep (i.e., idle mode) regime to extend their battery life. In addition, to further conserve the battery of the access terminal, the access terminal may only be required to register with the core network after passing through the coverage area of several access points (e.g., eNBs) constituting a paging area (e.g., a zone, a tracking area, etc.). To accommodate this registration scheme, the access terminal may be paged by all of the access points in the paging area.

However, with local breakout, the access terminal may need to be paged to deliver packets that do not flow through the wireless operator's core network. Rather these packets may arrive at a particular access point (e.g., HeNB) that is connected to the corresponding local network. Moreover, when an access terminal is to be paged to deliver a packet arriving through a local breakout interface, it may be desirable to only page the access terminal at the access point that provides the local breakout, irrespective of the current paging area of the access terminal.

With respect to managing power consumption, conventional operator controlled wireless networks are set up such that only the traffic the access terminal is interested in is sent to the access terminal. In contrast, typical local networks (e.g., home networks) may utilize various protocols that send a large number of broadcast messages. These protocols include, for example, address resolution protocol ("ARP") for finding the media access control ("MAC") address of the nodes on the local network; universal plug-and-play ("UPnP") packets for service advertisement, discovery and configuration; server message block ("SMB") packets for windows networking; and specific device beacons (e.g., TIVO® DVR beacons).

Under normal network operation, the packets generated by such protocols shall be delivered to all nodes in the local network as they are sent using a broadcast IP address. However, there may be thousands of such packets in a typical network during a 24 hour period. As a result, with local breakout, an access terminal could be paged thousands of times during the day, thereby draining the battery of the access terminal much faster than normal (e.g., when the access terminal is served by a macro network).

Figure 2:
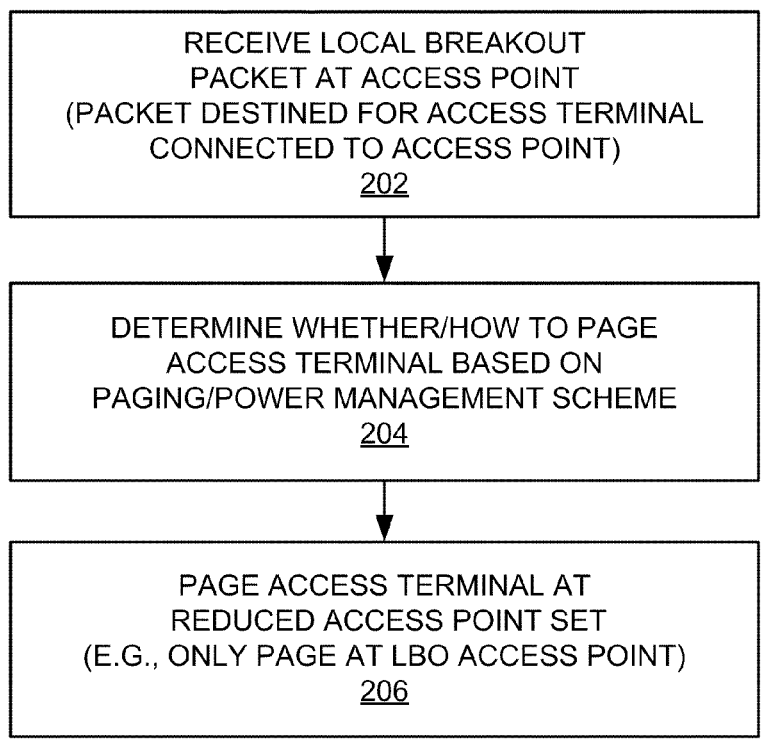
FIG. 2 is a flowchart of several sample aspects of operations that may be performed to manage paging and power consumption in conjunction with providing local breakout.

FIG. 2 provides an overview of paging and power management operations that may be employed to address these and other issues. For convenience, the operations of FIG. 2 (or any other operations discussed or taught herein) may be described as being performed by specific components (e.g., components of the system 100). It should be appreciated, however, that these operations may be performed by other types of components and may be performed using a different number of components. It also should be appreciated that one or more of the operations described herein may not be employed in a given implementation.

As represented by block 202, at some point in time a packet destined for the access terminal 102 (FIG. 1) arrives at the access point 104 via a local network. For example, the packet may originate at or be relayed by the correspondent node 124 or the correspondent node 122.

As represented by block 204, the access point 104 determines whether and/or how to page the access terminal 102 based on the particular paging and/or power management scheme implemented by the access point 104 and/or the access terminal 102. In accordance with the teachings herein, in some aspects these schemes may limit paging and/or packet traffic directed to the access terminal 102. For example, as discussed in more detail below in conjunction with FIGS. 6 and 7, in some implementations the access point 104 (e.g., by operation of a packet filter 136) filters local breakout traffic to reduce the number of pages or packets sent to the access terminal 102. Here, the filtering may be accomplished in a static manner (e.g., as described at FIG. 6) or in a dynamic manner based on an operating mode of the access terminal (e.g., as described at FIG. 7). In the latter case, the access terminal 102 (e.g., a filter mode controller 138) sends an indication of a current operational mode of the access terminal 102 to the access point 104 to enable the access point 104 (e.g., a filter mode controller 140) to control the packet filtering operation accordingly. As discussed in more detail below in conjunction with FIG. 8, in some implementations the access point 104 (e.g., a local breakout paging controller 142) sends an indication of a packet type while paging the access terminal 102, whereby the access terminal 102 determines whether to receive the packet based on the indication.

As discussed in more detail below in conjunction with FIG. 9, in some implementations the access terminal 102 (e.g., a link interface controller 144) selectively disables a local link interface to limit traffic at the access terminal 102.

As represented by block 206 of FIG. 2, in the event the access terminal 102 is to be paged (e.g., a received local breakout packet is not filtered), the access point 104 (e.g., the local breakout paging controller 142) initiates operations to cause the access terminal 102 to be paged. In some cases the access terminal 102 is only paged at the access point 104. In some cases the access terminal may be paged at some other reduced set of access points (e.g., reduced as compared to the set of access points that provide the current operator network paging area of the access terminal 102).

As discussed in more detail below in conjunction with FIG. 4, in some implementations the access point 104 (e.g., the local breakout paging controller 142) sends a request to the core network entity responsible for idle mode operations of the access terminal 102 to cause that entity to invoke a page of the access terminal 102. In the example of FIG. 1, this entity is represented in some aspects by the network node 106 which may include paging controller functionality (e.g., an MME). In some cases the request from the access point 104 may include an indication for the access terminal 102 to be paged only at the access point 104 (or at some other reduced set of access points). Alternatively, in other cases the core network entity may determine that the access terminal 102 is to be paged only at one of these reduced access point sets (e.g., based on receipt of the request from the access point 104). Here, paging at any other access points may be unnecessary since the access terminal 102 needs to be in the coverage area of the access point 104 to receive the local breakout packet. Consequently, it is highly likely that the access terminal 102 will hear the page from the access point 104.

As discussed in more detail below in conjunction with FIG. 5, in some implementations the access point 104 (e.g., the local breakout paging controller 142) autonomously pages the access terminal, without contacting the core network entity responsible for idle mode of the access terminal 102. Here, the access point 104 may acquire (e.g., retrieve) and store a copy of the idle context of the access terminal. Then, when a packet is received on the local breakout, the access point 104 pages the access terminal directly.

Figure 3:
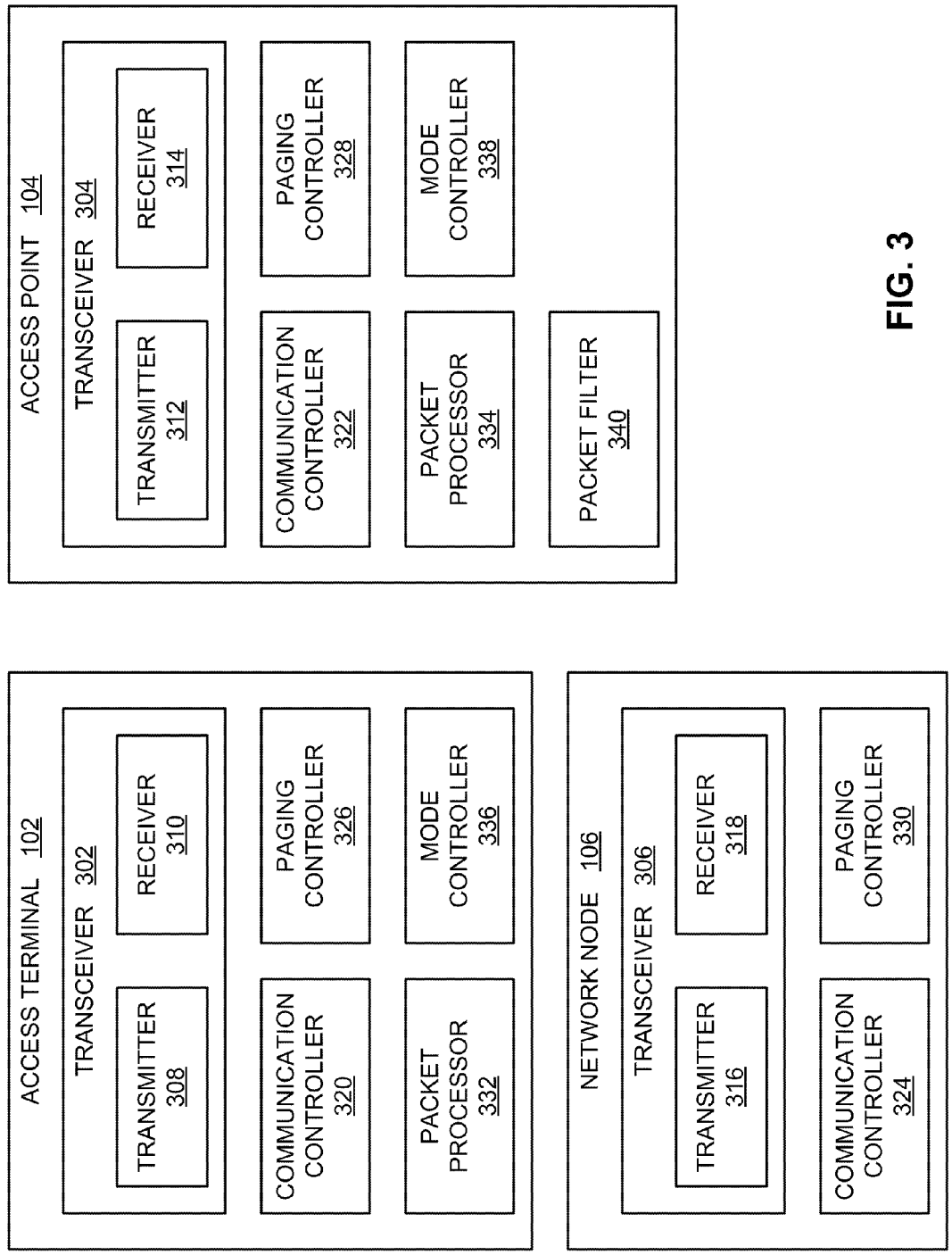
FIG. 3 is a simplified block diagram of several sample aspects of components that may be employed in communication nodes in conjunction with providing local breakout.

With the above overview in mind, additional details relating to providing paging and power management in accordance with the teachings herein will be described with reference to FIGS. 3-9. FIG. 3 illustrates several components that may be employed in communication nodes. The flowcharts of FIGS. 4 and 5 relate to various paging techniques. The flowcharts of FIGS. 6-9 relate to various power management techniques.

For purposes of illustration, FIG. 3 depicts sample components incorporated into the access terminal 102, the access point 104, and the network node 106 to perform paging and/or power management as taught herein. The described components also may be incorporated into other nodes in a communication system. For example, other nodes in a system may include components similar to those described for the access terminal 102, the access point 104, and the network node 106 to provide similar functionality. In addition, a given node may contain one or more of the described components.

As shown in FIG. 3, the access terminal 102, the access point 104, and the network node 106 may each include at least one transceiver block 302, 304, and 306 respectively, for communicating with other nodes. The transceiver block 302 depicts a transmitter 308 for sending signals and a receiver 310 for receiving signals. For example, the access terminal 102 may send messages such as mode indications to the access point 104 and receive pages, beacons, packets, and various other messages from the access point 104. The transceiver block 304 depicts a transmitter 312 for sending signals and a receiver 314 for receiving signals. For example, the access point 104 may transmit pages, beacons, packets, and various messages to the access terminal 102 and receive messages such as mode indications from the access terminal 102. In addition, the access point 104 may send messages such as requests to the network node 106 and receive page requests, idle context information, and network packets from the network node 106. The transceiver block 306 depicts a transmitter 316 for sending signals and a receiver 318 for receiving signals. For example, the network node 106 may send page requests, idle context information, and network packets to the access point 104 and receive messages such as requests from the access point 104.

Depending on the connectivity of the nodes of FIG. 3, the transceiver blocks of FIG. 3 may support different communication technologies. For example, a transceiver block may represent one or more transceivers that enable communication via a wired link and/or a wireless link. For example, communication between the access terminal 102 and the access point 104 is accomplished using wireless communication technology. In addition, in some cases communication (e.g., backhaul communication) between the network node 106 and the access point 104 is accomplished using wired communication technology. In other cases wireless technology may be employed here (e.g., where an access point accesses the network via a wireless relay).

The access terminal 102, the access point 104, and the network node 106 also include other components that may be used in conjunction with paging and/or power management as taught herein. For example, the access terminal 102, the access point 104, and the network node 106 may include communication controllers 320, 322, and 324, respectively, for managing communication with other nodes (e.g., establishing communication interfaces, sending and receiving messages/indications) and for providing other related functionality as taught herein. In addition, the access terminal 102, the access point 104, and the network node 106 may include a paging controller 326, a paging controller 328 (e.g., corresponding to controller 142 in FIG. 1), and a paging controller 330, respectively, for performing paging-related operations (e.g., receiving or sending pages or sending or receiving page-related requests) and for providing other related functionality as taught herein. The access terminal 102 and the access point 104 may include packet processors 332 and 334, respectively, for processing (e.g., sending and receiving) packets and for providing other related functionality as taught herein. The access terminal 102 and the access point 104 may include a mode controller 336 (e.g., corresponding to controller 138) and a mode controller 338 (e.g., corresponding to controller 140), respectively, for performing access terminal operating mode-related operations (e.g., generating an indication of the mode or determining the mode) and for providing other related functionality as taught herein. The access point 104 also may include a packet filter 340 (e.g., corresponding to filter 136) for filtering packets (e.g., determining whether to page the access terminal or deliver a packet to the access terminal) and for providing other related functionality as taught herein.

For convenience the access terminal 102, the access point 104, and the network node 106 are shown in FIG. 3 as including components that may be used in the various examples described below in conjunction with FIGS. 4-9. In practice, one or more of the illustrated components may not be used in a given example. As an example, in some implementations the access terminal 102 may not include the mode controller 336. Also, in some implementations the access point 104 may not include one or more of the packet filter 340 or the mode controller 338.

Furthermore, different operations may be performed by an illustrated component in different implementations. As an example, in some implementations the paging controller 328 may perform operations such as those described in FIG. 4 while in other implementations the paging controller 328 may perform operations such as those described in FIG. 5.

Figure 4:
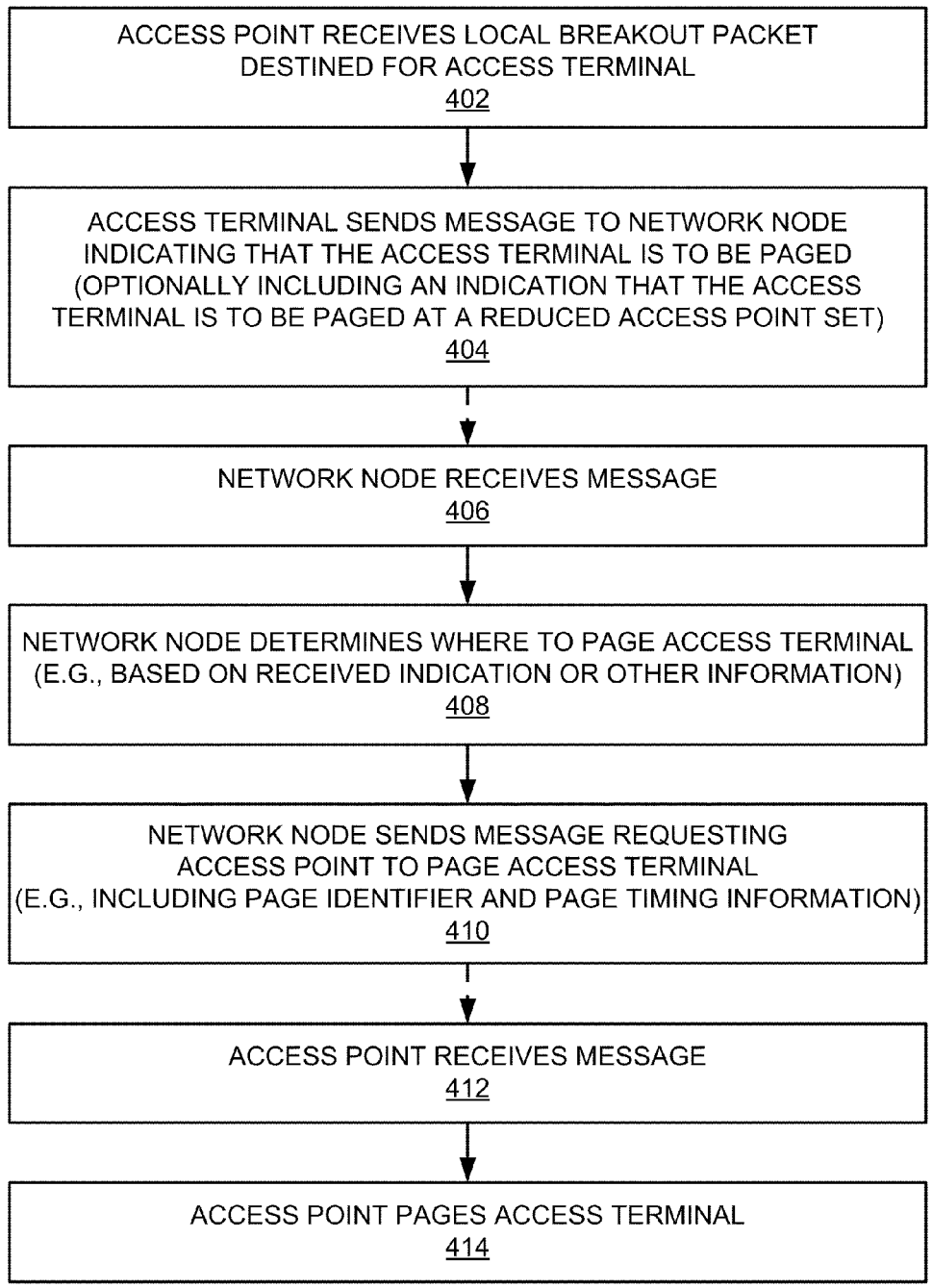
FIG. 4 is a flowchart of several sample aspects of operations that may be performed in conjunction with paging an access terminal via a network in response to receipt of a local breakout packet.

Referring now to FIG. 4, operations relating to a sample implementation where a network node manages local breakout paging will be described in more detail. As mentioned above, in this example, the access point 104 informs the network node 106 that a local breakout packet destined for the access terminal 102 has been received, whereupon the network node sends a message to cause the access point 104 to page the access terminal 102.

As represented by block 402, at some point in time the access point 104 (e.g., the packet processor 334, FIG. 3) receives a local breakout packet destined for the access terminal 102. As discussed herein, this packet may be received via a local breakout (e.g., from correspondent node 124 or 122) provided by the access point 104.

As represented by block 404, in response to the receipt of the packet at block 402, the access point 104 (e.g., the paging controller 328) sends a message to the network node 106 (e.g., an MME), wherein the message indicates (e.g., requests) that the access terminal 102 is to be paged. This message may take various forms. For example, in some cases the message includes an indication that a local breakout packet has been received.

In some cases the message includes an indication that a reduced access point set should be used to page the access terminal. Such an indication may comprise, for example, an identifier of the access point 104, an identifier of several access points (e.g., a set of neighboring access points), or an indication that a local breakout packet has been received.

The network node 106 receives this message as represented by block 406. For example, this message may be processed by the communication controller 324 depicted in FIG. 3.

As represented by block 408, the network node 106 (e.g., the paging controller 330) determines where to page the access terminal 102. For example, the network node 106 may determine that the access terminal 102 is to be paged at a reduced access point set. This determination may be based on an indication received in conjunction with the message from the access point 104 or based on other information available to the network node 106. As examples of the latter case, the network node 106 may determine that a reduced access point set is to be used: based on the packet being a local breakout packet; based on the message being sent from an access point that provides local breakout; based on the message being sent by an access point; or based on some on some other criterion or criteria.

As represented by block 410, in response to the message received at block 406, the network node 106 (e.g., the paging controller 330) sends a message to the access point 104 to instruct the access point 104 to page the access terminal 102. For example, the message may comprise a page request that includes a page identifier (e.g., an identifier assigned to the access terminal for paging) and page timing information (e.g., an indication of a paging interval and/or a paging offset).

The access point 104 receives this message as represented by block 412. As represented by block 414, the access point 104 (e.g., the paging controller 328) then pages the access terminal 102 in response to the receipt of this message.

Figure 5:
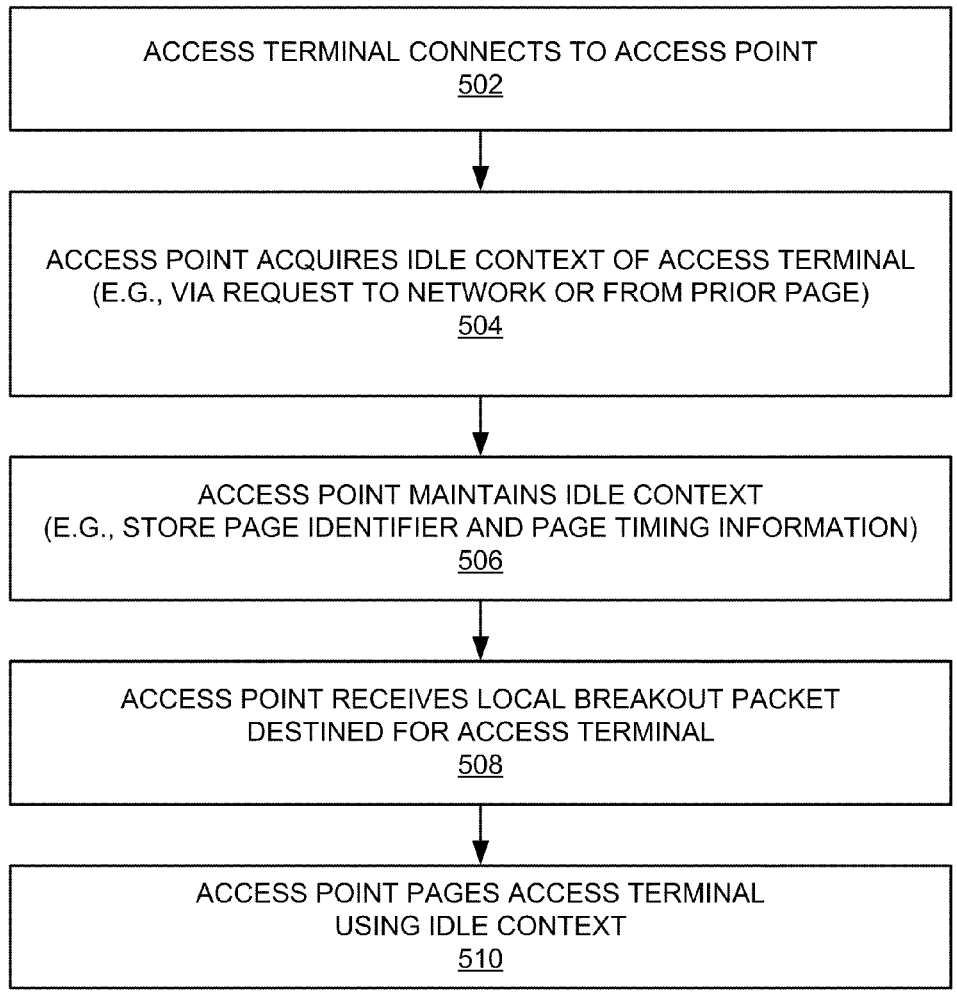
FIG. 5 is a flowchart of several sample aspects of operations that may be performed in conjunction with autonomous paging of an access terminal by an access point in response to receipt of a local breakout packet.

Referring to FIG. 5, operations relating to a sample implementation where an access point autonomously manages local breakout paging will be described in more detail. In this example, the access point 104 does not send a message to the network node 106 to invoke paging of the access terminal 102.

As represented by block 502, at some point in time the access terminal 102 connects to the access point 104. For example, in an implementation where the access point 104 is a HeNB, the access terminal 102 may register with the access point 104 when the user of the access terminal 102 is at home. Once this connection is made, the access point 104 may become the serving access point for the access terminal 102.

As represented by block 504, the access point 104 (e.g., the paging controller 328) acquires the idle context of the access terminal 102. This may be accomplished in various ways. For example, in some implementations the access point 104 sends a request to the network (e.g., network node 106) or to some other node for the idle context. In some implementations the access point 104 acquires the idle context from a prior page of the access terminal 102. For example, at some other point in time the network node 106 may have sent a page request to the access point 104 instructing the access point 104 to page the access terminal 102. As discussed above, such a page request may include idle context information such as a page identifier and an indication of page timing.

As represented by block 506, the access point 104 (e.g., the paging controller 328) may thus maintain the idle context of the access terminal 102 for use in one or more subsequent paging operations. For example, the access point 104 may temporarily store the page identifier and page timing information (or other information derived from the idle context) in a data memory.

As represented by block 508, at some point in time the access point 104 receives a local breakout packet destined for the access terminal 102. The access point 104 (e.g., the paging controller 328) may thus retrieve the idle context for this access terminal, and page the access terminal 102 using the idle context as represented by block 510. That is, the access point 104 may send a page comprising the page identifier at a time designated by the page timing information.

The operations of FIG. 5 may be implemented in various ways. In some implementations the access terminal 104 may acquire the idle context when the access terminal 102 connects to the access point 104. For example, the access point 104 may send a request for the idle context after a registration message from the access terminal 102 is received by the access point 104 (e.g., the communication controller 322). In some implementations the access terminal 104 may acquire the idle context after receiving the local packet. For example, the access point 104 may send a request for the idle context after receiving the packet. In such a case, the access point 104 may continue to maintain the idle context for subsequent packets or may acquire new context each time a packet or set of packets is received (i.e., the context is maintained for only a short period of time).

Figure 6:
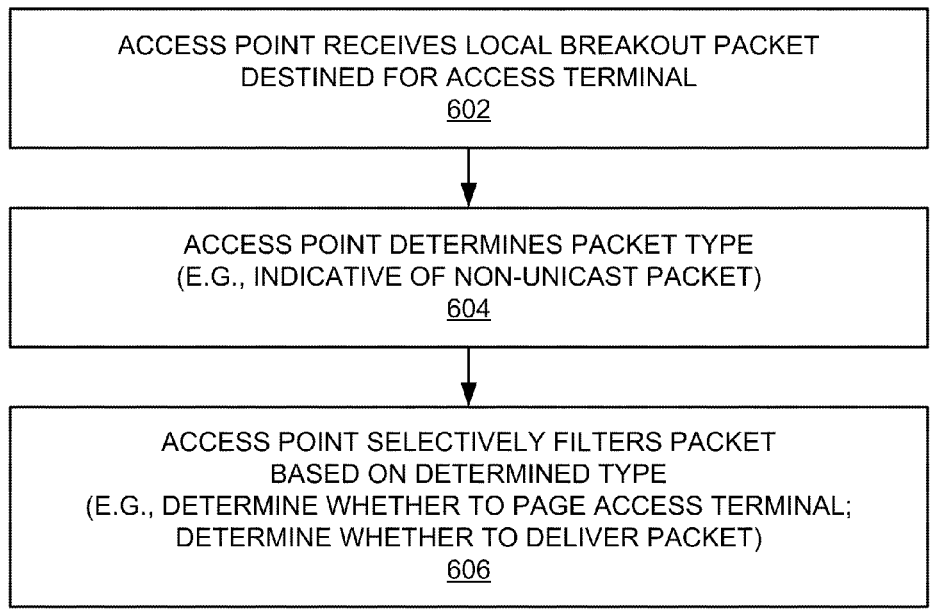
FIG. 6 is a flowchart of several sample aspects of operations that may be performed in conjunction with filtering local breakout packets destined for an access terminal.

Referring to FIG. 6, operations relating to a sample implementation where the access point 104 filters local breakout packets destined for the access terminal 102 will be described in more detail. In this example, the access point 104 filters out all non-unicast packets. It should be appreciated that different types of packets may be filtered (e.g., only broadcast packets) in other cases.

As represented by block 602, at some point in time the access point 104 receives a local breakout packet destined for the access terminal 102. For example, the packet may be received at the packet processor 334 which may be configured to process the packet to identify a packet type associated with the packet (block 604). For example, the packet type may indicate whether the packet is a unicast packet or a non-unicast packet (e.g., a broadcast packet or a multicast packet).

As represented by block 606, the access point 104 (e.g., the packet filter 340) selectively filters the received packet based on the determined packet type. For example, if the access terminal 102 is not in an active mode (e.g., the access terminal 102 is in a power saving idle mode), the access point 104 may elect to not page the access terminal 102 in response to the receipt of a non-unicast packet via the local breakout. Conversely, if the access terminal 102 is in an active mode (e.g., the access terminal 102 is actively communicating with the access point 104), the access point 104 may elect to not deliver a local breakout non-unicast packet to the access terminal 102.

The scheme of FIG. 6 thus reduces power consumption of the access terminal 102 by reducing the number of pages or packets sent to the access terminal 102. However, this scheme limits the usability of the local breakout feature to some extent. For example, it is preferable for the access terminal 102 to receive at least some broadcast packets so that the access terminal 102 may discover the devices that are connected on the network (e.g., a printer). In this way, the access terminal 102 may be able to readily communicate with such devices when requested by a user.

Figure 7:
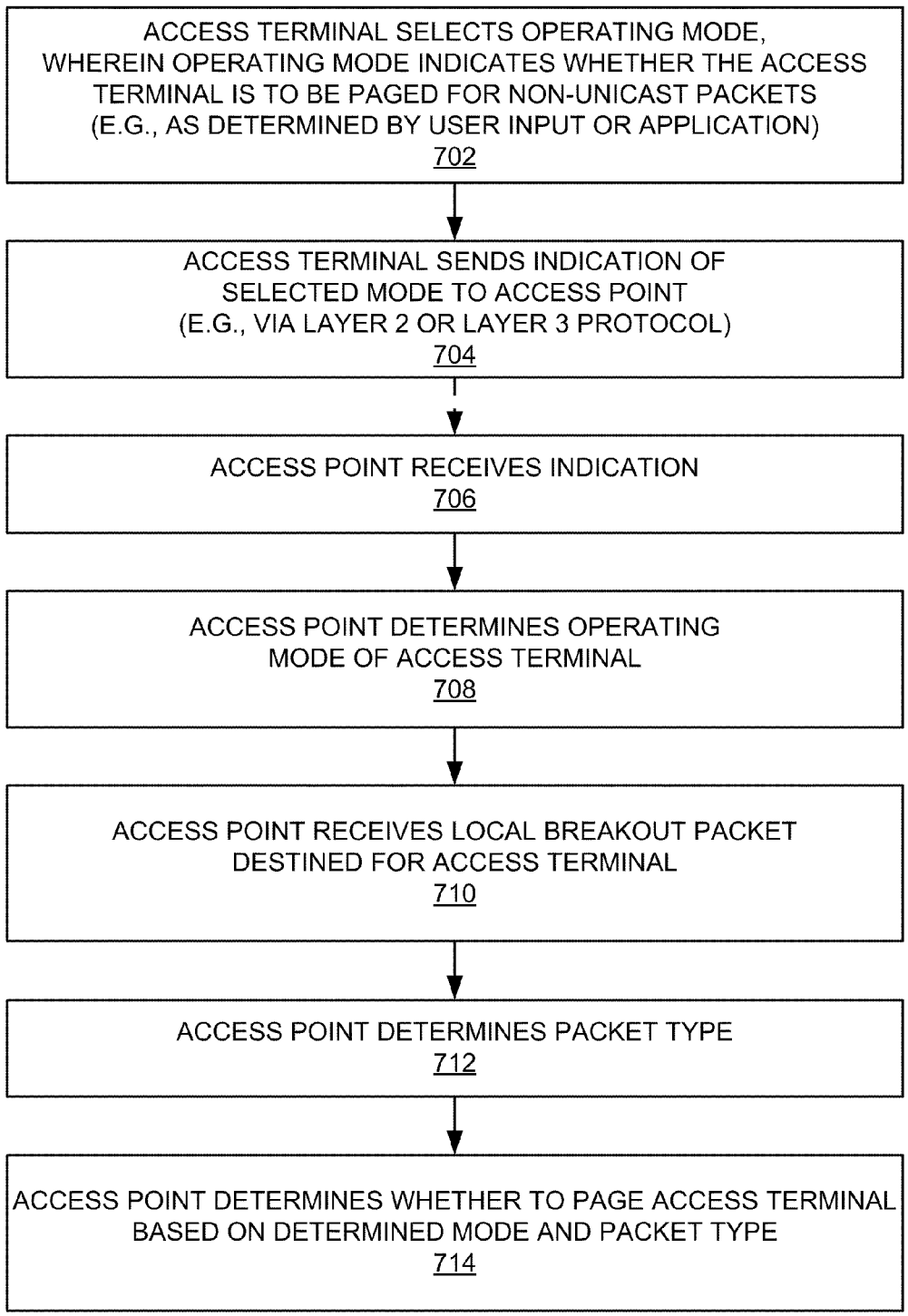
FIG. 7 is a flowchart of several sample aspects of operations that may be performed in conjunction with selectively filtering local breakout packets destined for an access terminal based on an operating mode of the access terminal.

Referring to FIG. 7, operations relating to a sample implementation where an access point selectively filters local breakout packets destined for the access terminal 102 will be described in more detail. In this example, the access point 104 filters out non-unicast packets based on the current operating mode of the access terminal 102. For example, in a regular operating mode the access terminal 102 is not paged for any broadcast packets to conserve battery power. In this case, the access terminal 102 only communicates with the other devices on the local network via unicast IP addresses. As a result, the access terminal 102 may not perform service discovery on the local network during this mode of operation. In contrast, in a broadcast-enabled operating mode, all packets (e.g., including broadcast and multicast packets) may be forwarded to the access terminal 102. In this mode, the access terminal 102 may perform service discovery on the local network. It should be appreciated that different types of packets may be filtered (e.g., only broadcast packets) in other cases and/or the selective filtering may be based on some other criterion or criteria in other cases.

As represented by block 702, at various points in time the access terminal 102 may select an operating mode that indicates whether the access terminal 102 is to be paged for certain types of packets. For example, at certain times the access terminal 102 (e.g., the mode controller 336) may elect to only receive unicast packets while at other times the access terminal 102 may elect to receive all packets (e.g., unicast and non-unicast packets).

The election of block 702 may be made in various ways. In some cases a user may initiate this election. For example, if the user decides that he or she wishes to access a local service (e.g., a printer on a home network), the user may manipulate a user input device of the access terminal 102 to enable paging for non-unicast packets. Otherwise, the user may place the access terminal 102 in a unicast-only mode. In these cases, the mode controller 336 may receive a signal from the input device to make the election.

In some cases an application on the access terminal 102 may make the election of block 702. For example, if an application determines that it (or some other application) needs to access a local service (e.g., a printer on a home network), the application may autonomously switch the operating mode to enable paging for non-unicast packets. In some cases, this determination may be based on some action of a user (e.g., invocation of an application such as a printing application). In addition, an application may cause the access terminal 102 to automatically revert back to the unicast-only mode (e.g., after a period of time or upon termination of a local access).

As represented by block 704, the access terminal 102 (e.g., the communication controller 320) sends an indication of the selected mode to the access point 104. This indication may be sent in various ways.

In some implementations the indication is sent via a layer 2 ("L2") air interface protocol between the access terminal 102 and the access point 104. This technique may thus require support from each air interface technology used by the access terminal 102 and the access point 104.

In some implementations the indication is sent via a layer 3 ("L3") protocol between the access terminal 102 and the access point 104. For example, a service discovery/advertisement protocol may be enhanced to convey the mode of the access terminal 102 to the access point 104. A potential protocol for accomplishing this is UPnP. Using UPnP, the access terminal 102 sends device advertisement messages, which contain information about the access terminal 102 and the mode it will be operating in (e.g., regular or broadcast-enabled). A discussed below, the access point 104 intercepts this message and controls the broadcast addressed packet delivery accordingly. Advantageously, the L3 technique may be air interface technology independent and may be utilized by any air interface technology.

The access point 104 receives the indication as represented by block 706. Accordingly, the access point 104 (e.g., the mode controller 338) may determine the operating mode of the access terminal 102 as represented by block 708.

As represented by block 710, at some point in time the access point 104 receives a local breakout packet destined for the access terminal 102. In addition, at block 712 the access point 104 may determine the type of this packet as discussed herein (e.g., if the access terminal 102 is operating in unicast-only mode). For example, the packet processor 334 may determine whether the packet is a non-unicast packet or a unicast packet.

As represented by block 714, the access point 104 (e.g., the paging controller 328) may then determine whether to page the access terminal 102 in response to the receipt of the packet. In some aspects, this determination may be based on the operating mode of the access terminal 102. In addition, this determination may be based on the determined packet type (e.g., if the access terminal is operating in unicast-only mode).

Figure 8:
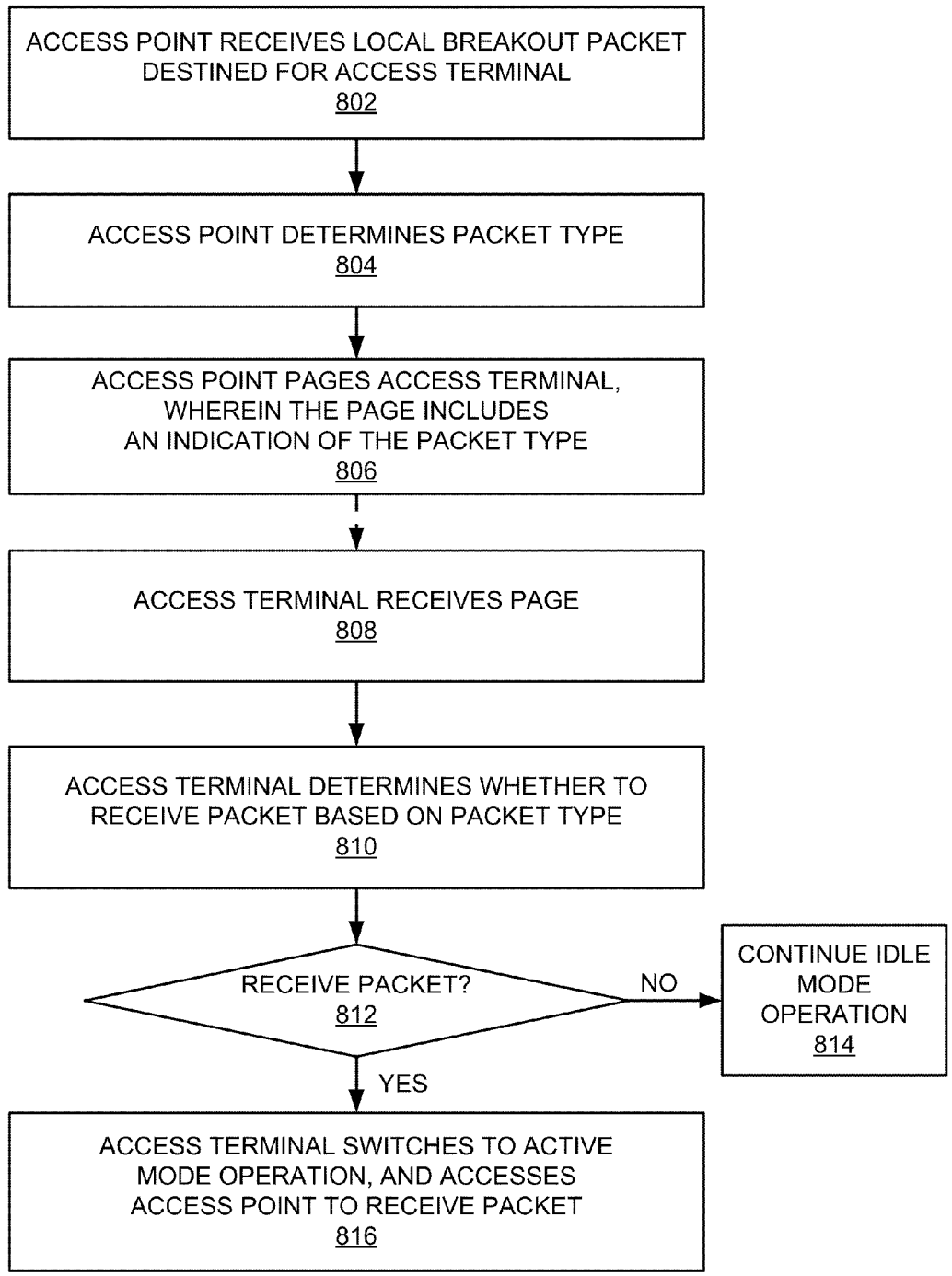
FIG. 8 is a flowchart of several sample aspects of operations that may be performed in conjunction with sending an indication of a received local breakout packet type when paging the destination access terminal to enable the access terminal to decide whether to receive the packet.

Referring to FIG. 8, operations relating to a sample implementation where an access terminal may elect to ignore a local breakout packet received at an access point will be described in more detail. In this example, the access point includes an indication of packet type when paging the access terminal to enable the access terminal to make this decision.

As represented by block 802, at some point in time the access point 104 receives a local breakout packet destined for the access terminal 102. In addition, at block 804 the access point 104 determines a packet type of this packet as discussed herein. For example, the packet processor 334 may determine whether the packet is one or more of: a unicast packet, a non-unicast packet, a broadcast packet, a local breakout packet, a network packet (e.g., received via a core network of a cellular network), a packet of a particular protocol, associated with a particular port number (e.g., a TCP port or UDP port), and so on.

As represented by block 806, the access point 104 (e.g., the paging controller 328) pages the access terminal 102 in response to the receipt of the packet. In this case, the page comprises an indication of the packet type determined at block 804. For example, the indication may comprise one or more bits that have been added to the page, or the indication may be encoded in the page. As a specific example, two bits may be added to the page message as follows: A first bit indicates whether the page is to deliver a packet from the local breakout interface or from operator's core network; while a second bit indicates whether the page is to deliver a packet with a unicast IP address or a non-unicast (e.g., broadcast/multicast) IP address.

The access terminal 102 (e.g., the paging controller 326) receives the page as represented by block 808. Accordingly, as represented by block 810, the access terminal 102 (e.g., the packet processor 332) may determine whether to receive the packet based on the packet type. For example, the access terminal 102 may elect to not receive certain types of packets (e.g., at certain times) to conserve battery power. In some implementations, the decision to receive a particular type of packet may be based on user input and/or a decision made by an application as discussed above in conjunction with block 702.

As represented by blocks 812 and 814, if the access terminal 102 elects to not receive the packet, the access terminal 102 may simply continue idle mode operations. That is, the access terminal 102 may continue with its normal sleep cycle instead of switching to active mode to retrieve the packet from the access point 104.

Conversely, if the access terminal 102 elects to receive the packet, the access terminal 102 may switch to active mode operation as represented by block 816. In this case, the access terminal 102 accesses the access point 104 to retrieve the packet.

Through the use of the power management scheme of FIG. 8, the access terminal 102 may implement algorithms to optimize its battery usage and connectivity. Moreover, this scheme does not need an interface between the access terminal 102 and the access point 104. To fully utilize this solution, some user interaction may be needed. For example, a user may put the access terminal 102 in scanning mode, in which case the access terminal 102 may wake up for all broadcast packets to discover all the other devices in a local (e.g., home) network. In regular mode, the access terminal 102 may not wake up for page messages that indicate a non-unicast page.

Figure 9:
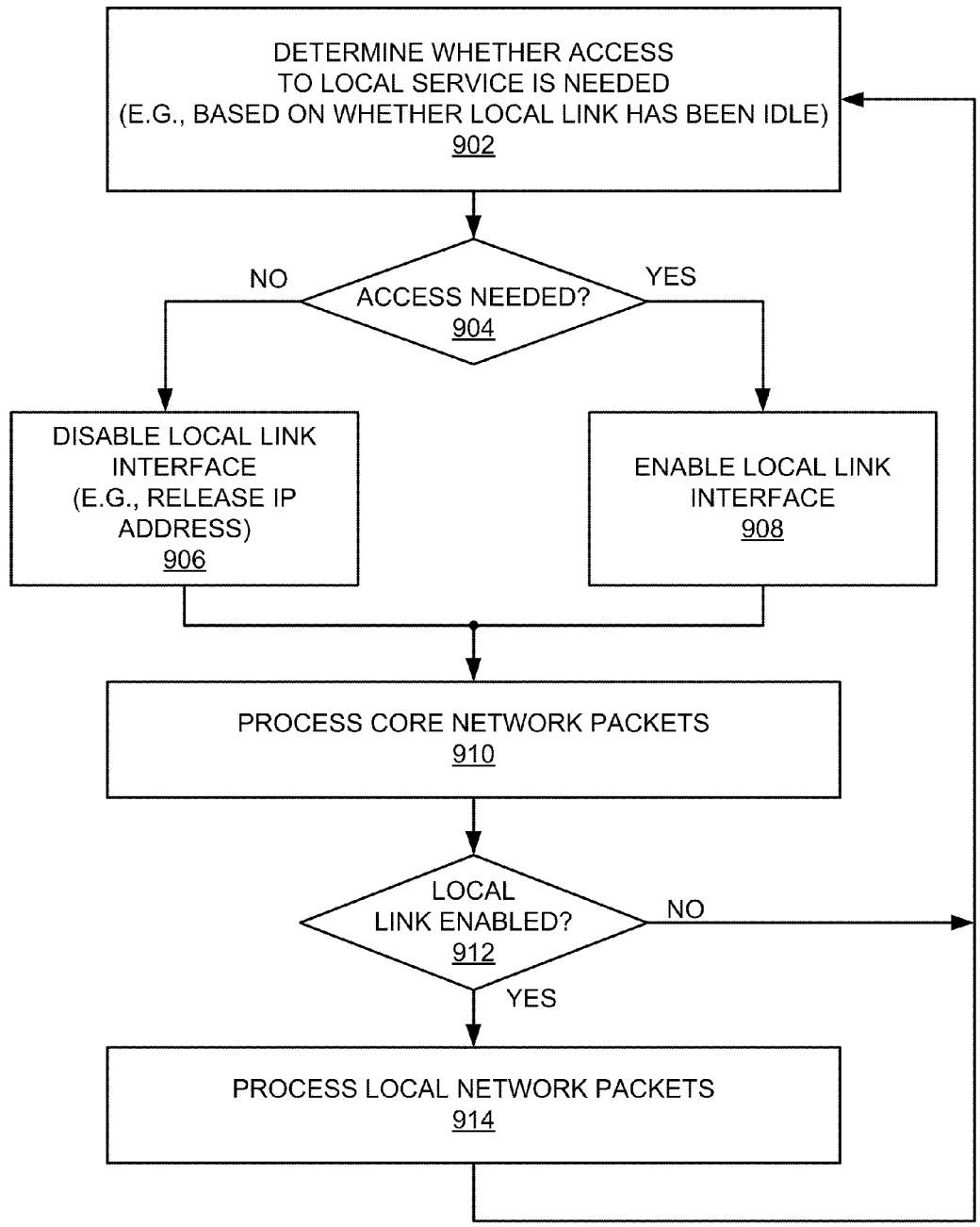
FIG. 9 is a flowchart of several sample aspects of operations that may be performed in conjunction with disabling a local link.

Referring to FIG. 9, operations relating to a sample implementation where an access terminal may selectively enable and disable a local link interface will be described in more detail. Here, the local link interface may be provided between the access terminal 102 and the access point 104 (that provides local breakout for the access terminal 102).

As represented by block 902, the access terminal 102 (e.g., the communication controller 320) determines whether access to a local network (i.e., local breakout) is needed. For example, the access terminal 102 may elect to turn off its local link interface when the local link has been idle for a certain amount of time so that the access terminal 102 will not be paged for any packet on the local link.

As represented by blocks 904 and 906, if local access is not needed, the access terminal 102 (e.g., the communication controller 320) disables the local link interface. For example, the access terminal 102 may release the corresponding IP address and "switch off" the corresponding L2 link. In some implementations, to save additional power, the access terminal 102 may turn off one or more components associated with the local link interface.

As represented by block 908, if local access is needed, the access terminal 102 keeps the local link enabled or re-enables the link. For example, if the local link had been disable, when the access terminal 102 needs a local breakout service, the link would be re-established (e.g., in a broadcast-enabled mode).

As represented by blocks 910 and 912, the access terminal 102 may continue processing network packets (e.g., packets to and from the core network of a cellular network) irrespective of whether the local link is enabled.

If the access terminal 102 later needs to access a local service (e.g., send a print job) the access terminal 102 may: 1) connect and thereby enable the local link interface (block 908); 2) discover the local services (e.g., printer); 3) process local network packets at block 914 (e.g., send a print job); and 4) disconnect, if desired (thereby disabling the local link interface again at block 906). An advantage of this scheme is that there may be no change to default access point behavior or no need for a new protocol to exchange mode information. If the access terminal 102 needs to stay on for a long period (e.g., to send streaming video) the access terminal 102 may simply receive all local network (e.g., broadcast) packets as well.

As mentioned above, the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal ("AT") moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience). A node (e.g., an access point) that provides coverage over a relatively large area may be referred to as a macro node while a node that provides coverage over a relatively small area (e.g., a residence) may be referred to as a femto node. Similar principles may be applicable to nodes associated with other types of coverage areas. For example, a pico node may provide coverage (e.g., coverage within a commercial building) over an area that is smaller than a macro area and larger than a femto area.

In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively.

Figure 10:
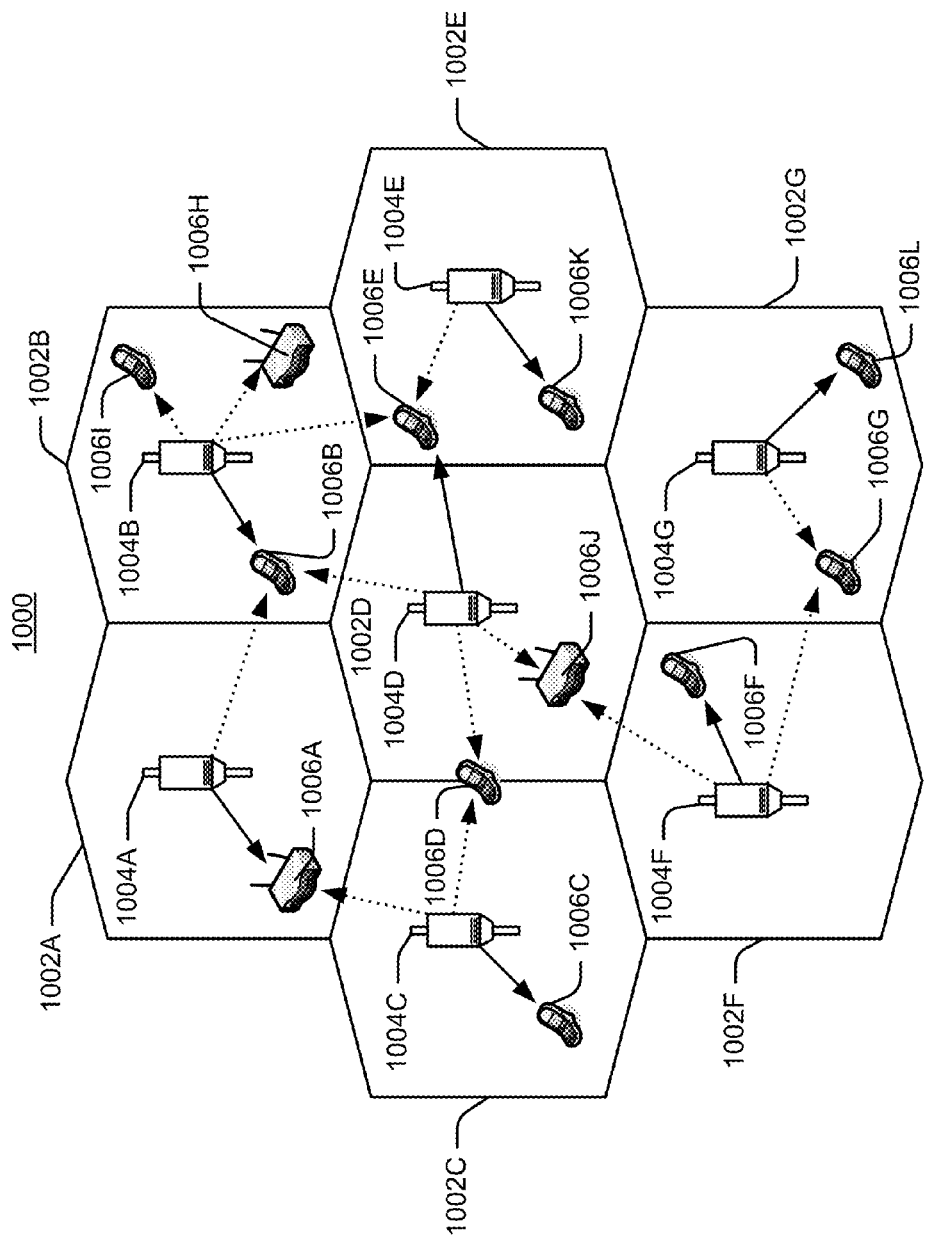
FIG. 10 is a simplified diagram of a wireless communication system.

FIG. 10 illustrates a wireless communication network 1000, configured to support a number of users, in which the teachings herein may be implemented. The system 1000 provides communication for multiple cells 1002, such as, for example, macro cells 1002A-1002G, with each cell being serviced by a corresponding access point 1004 (e.g., access points 1004A-1004G). As shown in FIG. 10, access terminals 1006 (e.g., access terminals 1006A-1006L) may be dispersed at various locations throughout the system over time. Each access terminal 1006 may communicate with one or more access points 1004 on a forward link ("FL") and/or a reverse link ("RL) at a given moment, depending upon whether the access terminal 1006 is active and whether it is in soft handoff, for example. The wireless communication network 1000 may provide service over a large geographic region. For example, macro cells 1002A-1002G may cover a few blocks in a neighborhood or several miles in rural environment.

Figure 11:
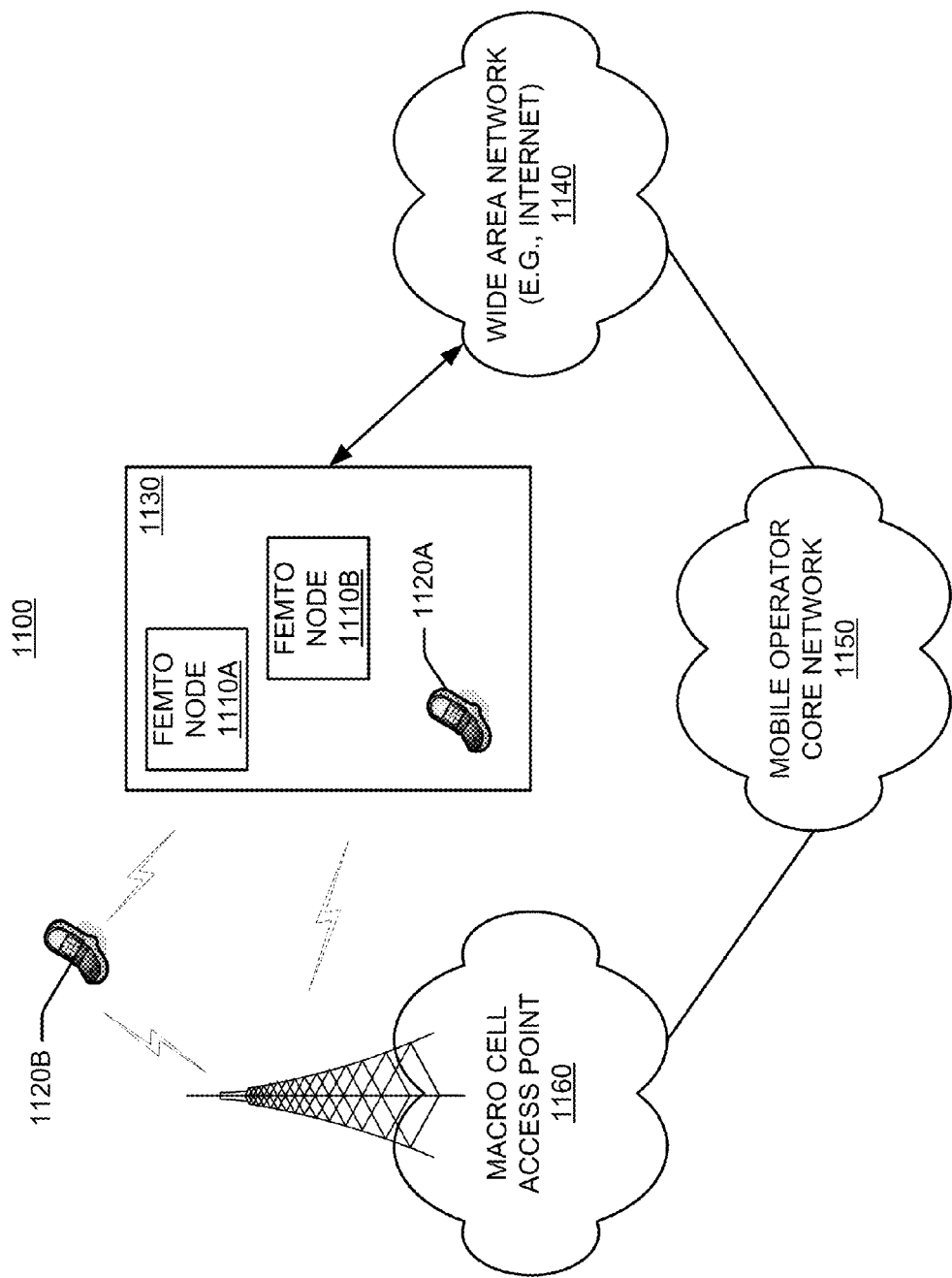
FIG. 11 is a simplified diagram of a wireless communication system including femto nodes.

FIG. 11 illustrates an exemplary communication system 1100 where one or more femto nodes are deployed within a network environment (e.g., network 1000). Specifically, the system 1100 includes multiple femto nodes 1110 (e.g., femto nodes 1110A and 1110B) installed in a relatively small scale network environment (e.g., in one or more user residences 1130). Each femto node 1110 may be coupled to a wide area network 1140 (e.g., the Internet) and a mobile operator core network 1150 via a DSL router, a cable modem, a wireless link, or other connectivity means (not shown). As will be discussed below, each femto node 1110 may be configured to serve associated access terminals 1120 (e.g., access terminal 1120A) and, optionally, other (e.g., hybrid or alien) access terminals 1120 (e.g., access terminal 1120B). In other words, access to femto nodes 1110 may be restricted whereby a given access terminal 1120 may be served by a set of designated (e.g., home) femto node(s) 1110 but may not be served by any non-designated femto nodes 1110 (e.g., a neighbor's femto node 1110).

Figure 12:
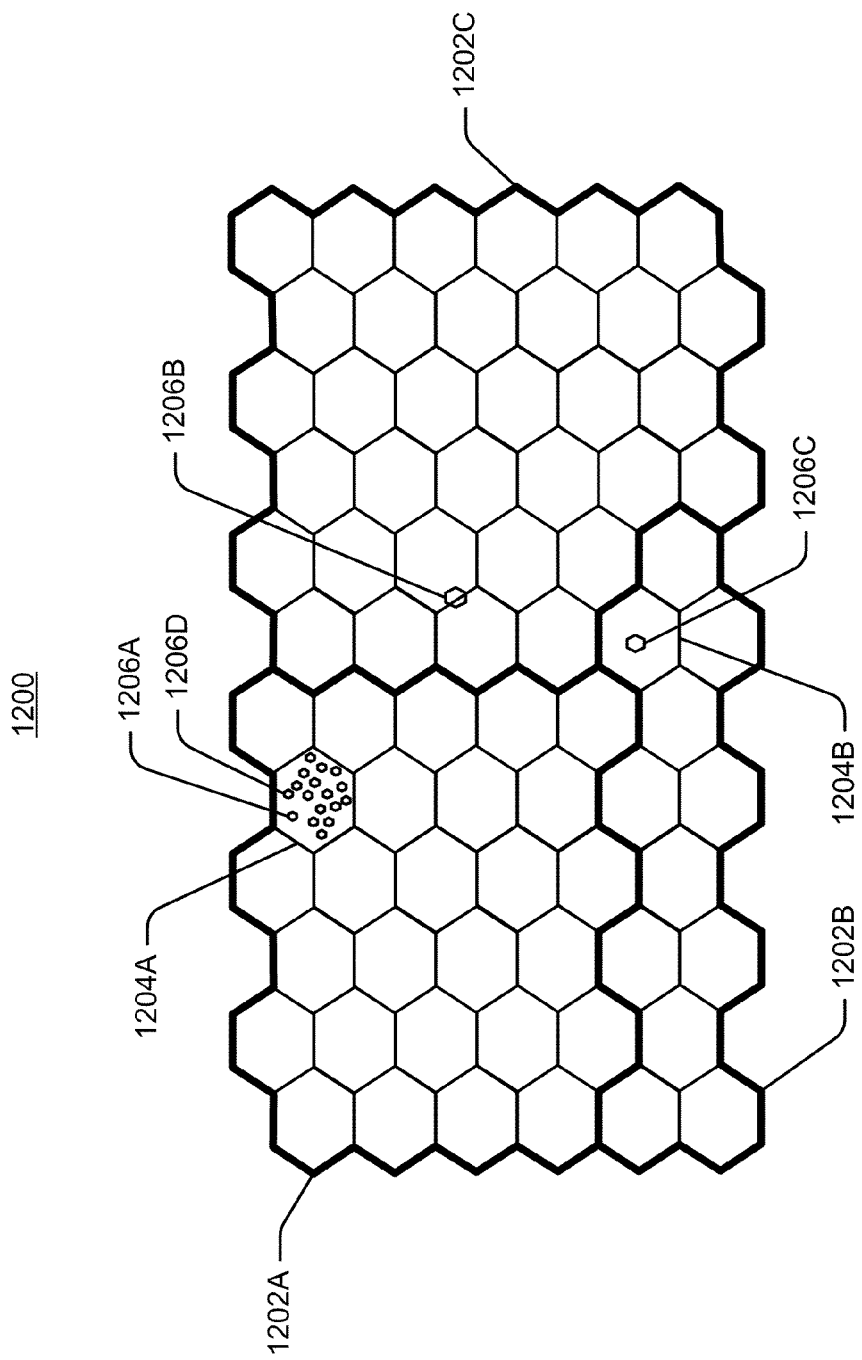
FIG. 12 is a simplified diagram illustrating coverage areas for wireless communication.

FIG. 12 illustrates an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the larger hexagons. The tracking areas 1202 also include femto coverage areas 1206. In this example, each of the femto coverage areas 1206 (e.g., femto coverage area 1206C) is depicted within one or more macro coverage areas 1204 (e.g., macro coverage area 1204B). It should be appreciated, however, that some or all of a femto coverage area 1206 may not lie within a macro coverage area 1204. In practice, a large number of femto coverage areas 1206 may be defined with a given tracking area 1202 or macro coverage area 1204. Also, one or more pico coverage areas (not shown) may be defined within a given tracking area 1202 or macro coverage area 1204.

Referring again to FIG. 11, the owner of a femto node 1110 may subscribe to mobile service, such as, for example, 3G mobile service, offered through the mobile operator core network 1150. In addition, an access terminal 1120 may be capable of operating both in macro environments and in smaller scale (e.g., residential) network environments as discussed above. In other words, depending on the current location of the access terminal 1120, the access terminal 1120 may be served by a macro cell access point 1160 associated with the mobile operator core network 1150 or by any one of a set of femto nodes 1110 (e.g., the femto nodes 1110A and 1110B that reside within a corresponding user residence 1130). For example, when a subscriber is outside his home, he is served by a standard macro access point (e.g., access point 1160) and when the subscriber is at home, he is served by a femto node (e.g., node 1110A). Here, a femto node 1110 may be backward compatible with legacy access terminals 1120.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1110 that reside within the corresponding user residence 1130). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. Each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 13:
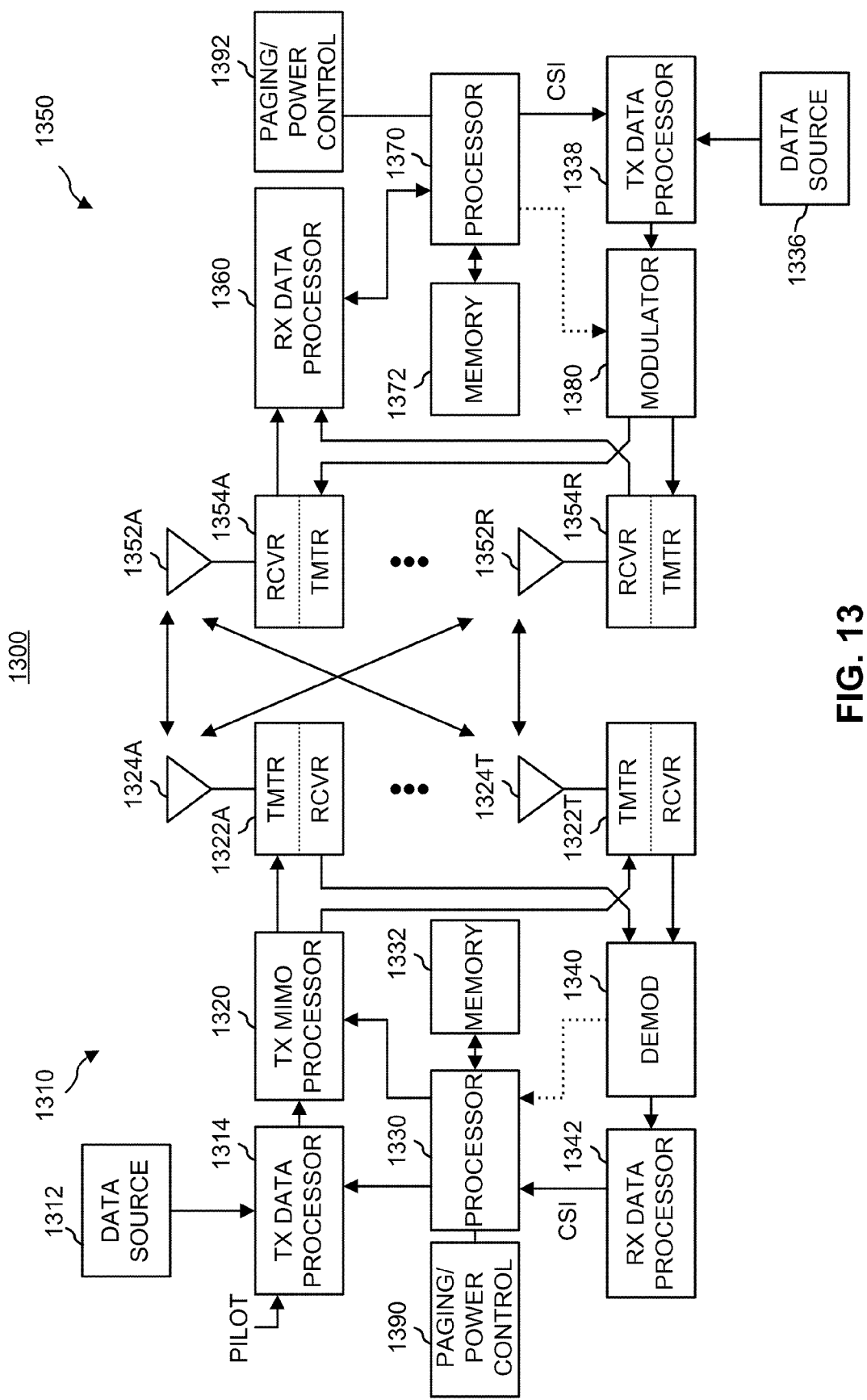
FIG. 13 is a simplified block diagram of several sample aspects of communication components.
Figure 14:
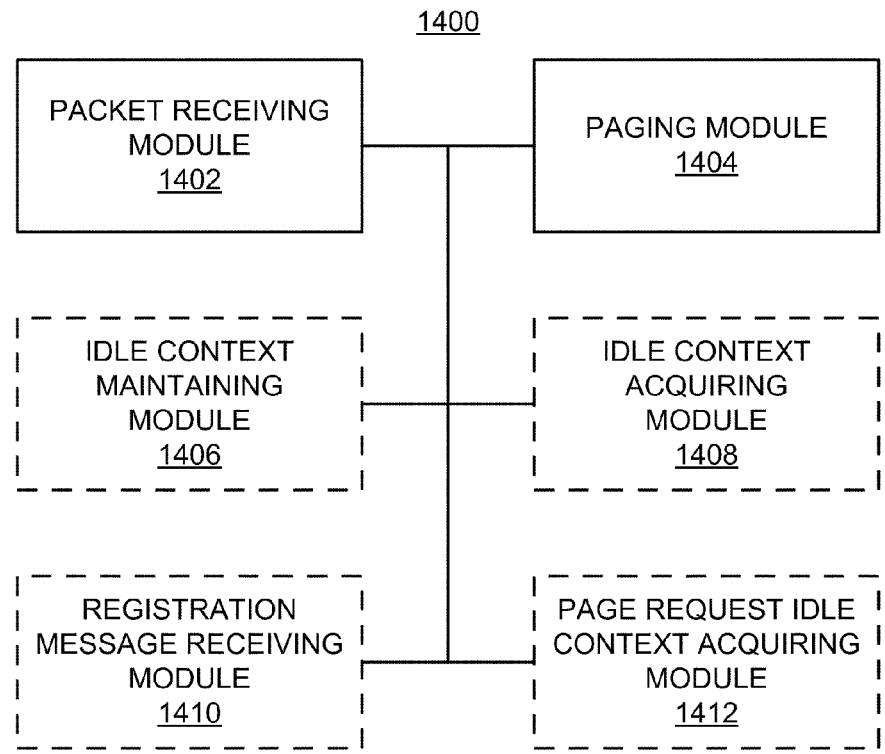
FIGS. 14-21 are simplified block diagrams of several sample aspects of apparatuses configured to provide local breakout operations as taught herein.
Figure 15:
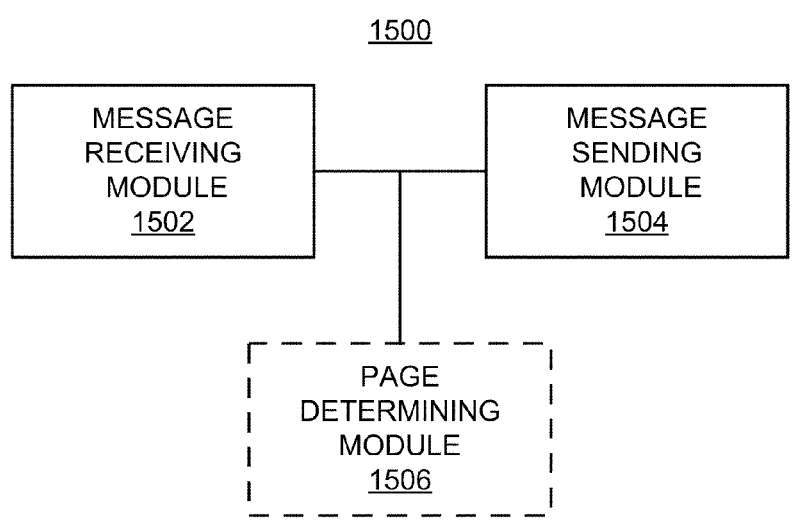
Figure 16:
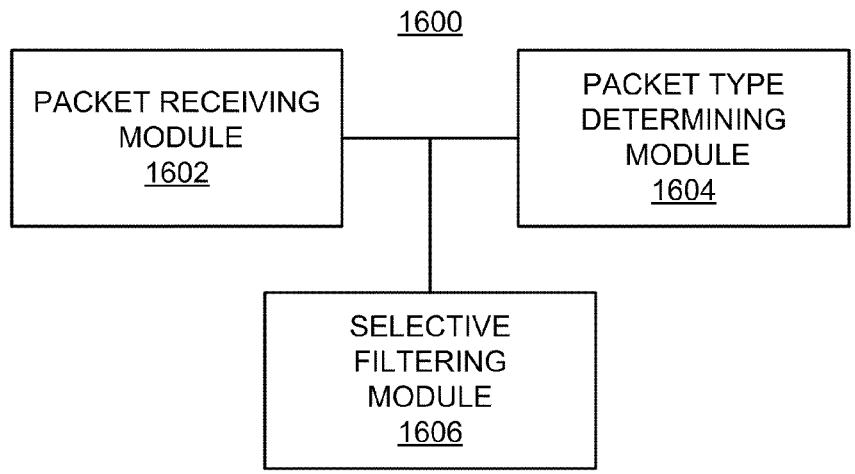
Figure 17:
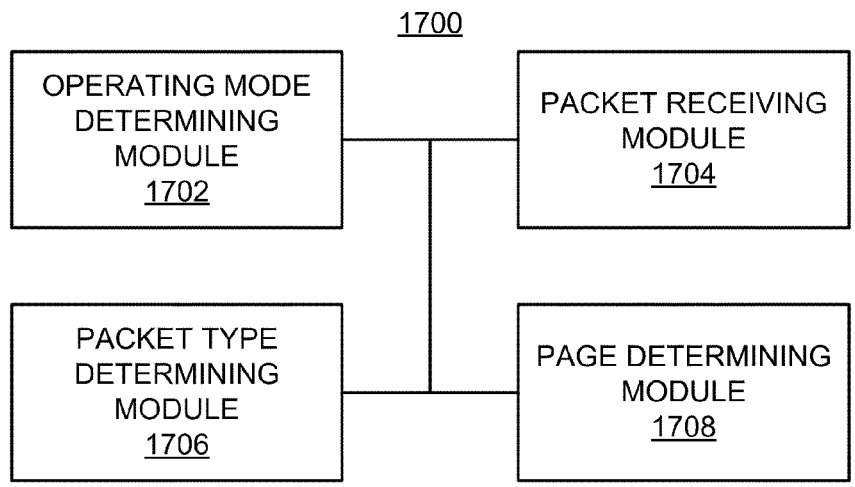
Figure 18:
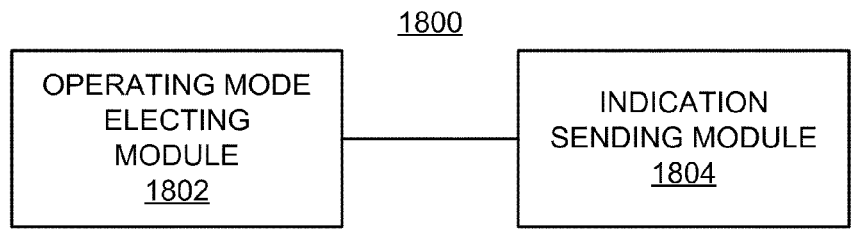
Figure 19:
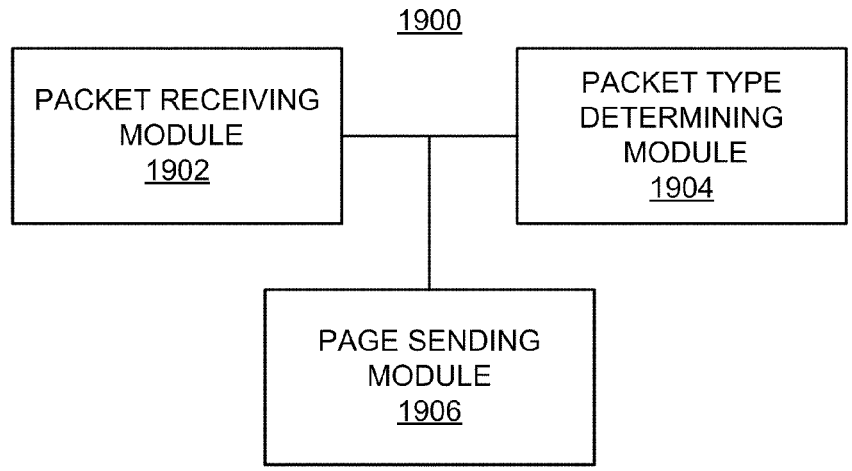
Figure 20:
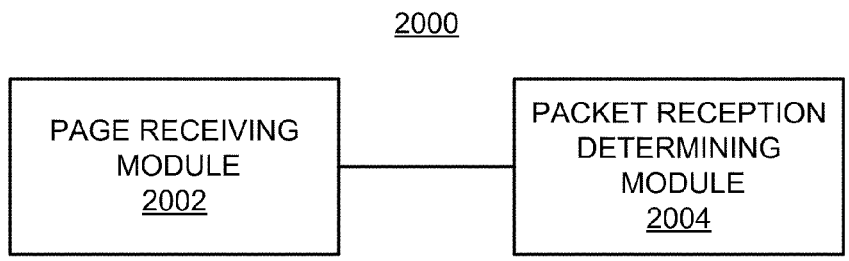
Figure 21:
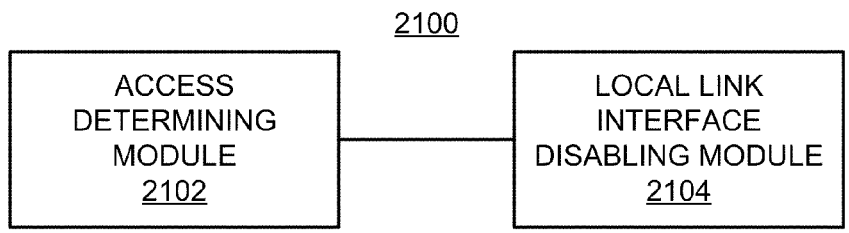

The teachings herein may be incorporated into a node (e.g., a device) employing various components for communicating with at least one other node. FIG. 13 depicts several sample components that may be employed to facilitate communication between nodes. Specifically, FIG. 13 illustrates a wireless device 1310 (e.g., an access point) and a wireless device 1350 (e.g., an access terminal) of a MIMO system 1300. At the device 1310, traffic data for a number of data streams is provided from a data source 1312 to a transmit ("TX") data processor 1314.

In some aspects, each data stream is transmitted over a respective transmit antenna. The TX data processor 1314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1330. A data memory 1332 may store program code, data, and other information used by the processor 1330 or other components of the device 1310.

The modulation symbols for all data streams are then provided to a TX MIMO processor 1320, which may further process the modulation symbols (e.g., for OFDM). The TX MIMO processor 1320 then provides $N_T$ modulation symbol streams to $N_T$ transceivers ("XCVR") 1322A through 1322T. In some aspects, the TX MIMO processor 1320 applies beam-forming weights to the symbols of the data streams and to the antenna from which the symbol is being transmitted.

Each transceiver 1322 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1322A through 1322T are then transmitted from $N_T$ antennas 1324A through 1324T, respectively.

At the device 1350, the transmitted modulated signals are received by $N_R$ antennas 1352A through 1352R and the received signal from each antenna 1352 is provided to a respective transceiver ("XCVR") 1354A through 1354R. Each transceiver 1354 conditions (e.g., filters, amplifies, and downconverts) a respective received signal, digitizes the conditioned signal to provide samples, and further processes the samples to provide a corresponding "received" symbol stream.

A receive ("RX") data processor 1360 then receives and processes the $N_R$ received symbol streams from $N_R$ transceivers 1354 based on a particular receiver processing technique to provide $N_T$ "detected" symbol streams. The RX data processor 1360 then demodulates, deinterleaves, and decodes each detected symbol stream to recover the traffic data for the data stream. The processing by the RX data processor 1360 is complementary to that performed by the TX MIMO processor 1320 and the TX data processor 1314 at the device 1310.

A processor 1370 periodically determines which pre-coding matrix to use (discussed below). The processor 1370 formulates a reverse link message comprising a matrix index portion and a rank value portion. A data memory 1372 may store program code, data, and other information used by the processor 1370 or other components of the device 1350.

The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by the transceivers 1354A through 1354R, and transmitted back to the device 1310.

At the device 1310, the modulated signals from the device 1350 are received by the antennas 1324, conditioned by the transceivers 1322, demodulated by a demodulator ("DE-MOD") 1340, and processed by a RX data processor 1342 to extract the reverse link message transmitted by the device 1350. The processor 1330 then determines which pre-coding matrix to use for determining the beam-forming weights then processes the extracted message.

FIG. 13 also illustrates that the communication components may include one or more components that perform paging/power control operations as taught herein. For example, a paging/power control component 1390 may cooperate with the processor 1330 and/or other components of the device 1310 to send/receive signals to/from another device (e.g., device 1350) as taught herein. Similarly, a paging/power control component 1392 may cooperate with the processor 1370 and/or other components of the device 1350 to send/receive signals to/from another device (e.g., device 1310). It should be appreciated that for each device 1310 and 1350 the functionality of two or more of the described components may be provided by a single component. For example, a single processing component may provide the functionality of the paging/power control component 1390 and the processor 1330 and a single processing component may provide the functionality of the paging/power control component 1392 and the processor 1370.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), a macro cell, a macro node, a Home eNB ("HeNB"), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 14-21, apparatuses 1400, 1500, 1600, 1700, 1800, 1900, 2000, and 2100 are represented as a series of interrelated functional modules. Here, a packet receiving module 1402 may correspond at least in some aspects to, for example, a packet processor as discussed herein. A paging module 1404, an idle context maintaining module 1406, an idle context acquiring module 1408, and a page request idle context maintaining module 1412 may each correspond at least in some aspects to, for example, a paging controller as discussed herein. A registration message receiving module 1410 may correspond at least in some aspects to, for example, a communication controller as discussed herein. A message receiving module 1502 may correspond at least in some aspects to, for example, a communication controller as discussed herein. A message sending module 1504 may correspond at least in some aspects to, for example, a paging controller as discussed herein. A page determining module 1506 may correspond at least in some aspects to, for example, a paging controller as discussed herein. A packet receiving module 1602 and a packet type determining module 1604 may each correspond at least in some aspects to, for example, a packet processor as discussed herein. A selective filtering module 1606 may correspond at least in some aspects to, for example, a packet filter as discussed herein. An operating mode determining module 1702 may correspond at least in some aspects to, for example, a mode controller as discussed herein. A packet receiving module 1704 and a packet type determining module 1706 may each correspond at least in some aspects to, for example, a packet processor as discussed herein. A page determining module 1708 may correspond at least in some aspects to, for example, a paging controller as discussed herein. An operating mode electing module 1802 may correspond at least in some aspects to, for example, a mode controller as discussed herein. An indication sending module 1804 may correspond at least in some aspects to, for example, a communication controller as discussed herein. A packet receiving module 1902 and a packet type determining module 1904 may each correspond at least in some aspects to, for example, a packet processor as discussed herein. A page sending module 1906 may correspond at least in some aspects to, for example, a paging controller as discussed herein. A page receiving module 2002 may correspond at least in some aspects to, for example, a paging controller as discussed herein. A packet reception determining module 2004 may correspond at least in some aspects to, for example, a packet processor as discussed herein. An access determining module 2102 may correspond at least in some aspects to, for example, a mode controller as discussed herein. A local link interface disabling module 2104 may correspond at least in some aspects to, for example, a communication controller as discussed herein.

The functionality of the modules of FIGS. 14-21 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 14-21 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
determining, at an access point, whether an access terminal served by the access point is operating in a first mode or a second mode, wherein in the first mode the access terminal is to be paged for unicast and non-unicast packets and in the second mode the access terminal is to be paged only for unicast packets, and wherein an election by the access terminal of the first mode or the second mode is based on whether an application has been initiated in the access terminal that requires access to a local service;
receiving a packet destined for the access terminal at the access point;
determining a packet type of the received packet, wherein the packet type indicates whether the received packet is a unicast or a non-unicast packet; and
determining, based on the determined type and the determination of whether the access terminal is operating in the first mode or the second mode, whether to page the access terminal as a result of the receipt of the packet.

2. The method of claim 1, wherein the determination of whether the access terminal is operating in the first mode or the second mode comprises receiving an operating mode indication from the access terminal via a layer 2 protocol.

3. The method of claim 1, wherein the determination of whether the access terminal is operating in the first mode or the second mode comprises receiving an operating mode indication from the access terminal via a layer 3 protocol.

4. The method of claim 1, wherein the non-unicast packet is a broadcast packet.

5. The method of claim 1, wherein the packet is received from a local network to which the access point is connected.

6. The method of claim 5, wherein the local network comprises:
a local area network; or
an internet connection that is not accessed via a cellular network.

7. The method of claim 1, wherein the access terminal may automatically switch from the first mode to the second mode after a period of time or upon termination of the access to the local service.

8. The method of claim 1, wherein access to the local service further comprises access through a local network without going through an operator core network.

9. An apparatus for communication, comprising:
a mode controller configured to determine, at an access point, whether an access terminal served by the access point is operating in a first mode, wherein in the first mode the access terminal is to be paged for unicast and non-unicast packets and in the second mode the access terminal is to be paged only for unicast packets, and wherein an election by the access terminal of the first mode or the second mode is based on whether an application has been initiated in the access terminal that requires access to a local service;
a packet processor configured to receive a packet destined for the access terminal at the access point, and further configured to determine a packet type of the received packet, wherein the packet type indicates whether the received packet is a unicast or a non-unicast packet; and
a paging controller configured to determine, based on the determined type and the determination of whether the access terminal is operating in the first mode or the second mode, whether to page the access terminal as a result of the receipt of the packet.

10. The apparatus of claim 9, wherein the determination of whether the access terminal is operating in the first mode or the second mode comprises receiving an operating mode indication from the access terminal via a layer 2 protocol.

11. The apparatus of claim 9, wherein the determination of whether the access terminal is operating in the first mode or the second mode comprises receiving an operating mode indication from the access terminal via a layer 3 protocol.

12. The apparatus of claim 9, wherein the packet is received from a local network to which the access point is connected.

13. The apparatus of claim 9, wherein the access terminal may automatically switch from the first mode to the second mode after a period of time or upon termination of the access to the local service.

14. The apparatus of claim 9, wherein access to the local service further comprises access through a local network without going through an operator core network.

15. An apparatus for communication, comprising:
means for determining, at an access point, whether an access terminal served by the access point is operating in a first mode or a second mode, wherein in the first mode the access terminal is to be paged for unicast and non-unicast packets and in the second mode the access terminal is to be paged only for unicast packets, and wherein an election by the access terminal of the first mode or the second mode is based on whether an application has been initiated in the access terminal that requires access to a local service;
means for receiving a packet destined for the access terminal at the access point;
means for determining a packet type of the received packet, wherein the packet type indicates whether the received packet is a unicast or a non-unicast packet; and
means for determining, based on the determined type and the determination of whether the access terminal is operating in the first mode or the second mode or the third mode, whether to page the access terminal as a result of the receipt of the packet.

16. The apparatus of claim 15, wherein the determination of whether the access terminal is operating in the first mode or the second mode comprises receiving an operating mode indication from the access terminal via a layer 2 protocol.

17. The apparatus of claim 15, wherein the determination of whether the access terminal is operating in the first mode or the second mode comprises receiving an operating mode indication from the access terminal via a layer 3 protocol.

18. The apparatus of claim 15, wherein the packet is received from a local network to which the access point is connected.

19. A computer-program product, comprising:
a non-transitory computer-readable medium comprising code for causing a computer to:
determine, at an access point, whether an access terminal served by the access point is operating in a first mode or a second mode, wherein in the first mode the access terminal is to be paged for unicast and non-unicast packets and in the second mode the access terminal is to be paged only for unicast packets, and wherein an election by the access terminal of the first mode or the second mode is based on whether an application has been initiated in the access terminal that requires access to a local service;
receive a packet destined for the access terminal at the access point;

determine a packet type of the received packet, wherein the packet type indicates whether the received packet is a unicast or a non-unicast packet; and determine, based on the determined type and the determination of whether the access terminal is operating in the first mode or the second mode, whether to page the access terminal as a result of the receipt of the packet.

20. The computer-program product of claim 19, wherein the determination of whether the access terminal is operating in the first mode or the second mode comprises receiving an operating mode indication from the access terminal via a layer 2 protocol.

21. The computer-program product of claim 19, wherein the determination of whether the access terminal is operating in the first mode or the second mode comprises receiving an operating mode indication from the access terminal via a layer 3 protocol.

22. The computer-program product of claim 19, wherein the packet is received from a local network to which the access point is connected.

23. A method of communication, comprising:
electing, at an access terminal, to operate in a first mode or a second mode, wherein in the first mode the access terminal is to be paged for unicast and non-unicast packets and in the second mode the access terminal is to be paged only for unicast packets, and wherein the election of the first mode or the second mode is based on whether an application has been initiated that requires access to a local service; and
sending an indication of the election to a serving access point for the access terminal.

24. The method of claim 23, wherein the election is autonomously performed by an application executing on the access terminal.

25. The method of claim 23, wherein the election comprises receiving a signal from a user input device of the access terminal.

26. The method of claim 23, wherein the election is based on a decision to access a resource from a local network to which the access point is connected.

27. The method of claim 26, wherein the local network comprises:
a local area network; or
an internet connection that is not accessed via a cellular network.

28. The method of claim 23, wherein the indication is sent via a layer 2 protocol.

29. The method of claim 23, wherein the indication is sent via a layer 3 protocol.

30. The method of claim 23, further comprising automatically switching from the first mode to the second mode after a period of time or upon termination of the access to the local service.

31. The method of claim 23, wherein access to the local service further comprises access through a local network without going through an operator core network.

32. An apparatus for communication, comprising:
a mode controller configured to elect, at an access terminal, to operate in a first mode or a second mode, wherein in the first mode the access terminal is to be paged for unicast and non-unicast packets and in the second mode the access terminal is to be paged only for unicast packets, and wherein the election of the first mode or the second mode is based on whether an application has been initiated that requires access to a local service; and
a communication controller configured to send an indication of the election to a serving access point for the access terminal.

33. The apparatus of claim 32, wherein the election is autonomously performed by an application executing on the access terminal.

34. The apparatus of claim 32, wherein the election comprises receiving a signal from a user input device of the access terminal.

35. The apparatus of claim 32, wherein the election is based on a decision to access a resource from a local network to which the access point is connected.

36. The apparatus of claim 32, wherein the mode controller is configured to automatically switch from the first mode to the second mode after a period of time or upon termination of the access to the local service.

37. The apparatus of claim 32, wherein access to the local service further comprises access through a local network without going through an operator core network.

38. An apparatus for communication, comprising:
means for electing, at an access terminal, to operate in a first mode or a second mode, wherein in the first mode the access terminal is to be paged for unicast and non-unicast packets and in the second mode the access terminal is to be paged only for unicast packets, and wherein the election of the first mode or the second mode is based on whether an application has been initiated that requires access to a local service; and
means for sending an indication of the election to a serving access point for the access terminal.

39. The apparatus of claim 38, wherein the election is autonomously performed by an application executing on the access terminal.

40. The apparatus of claim 38, wherein the election comprises receiving a signal from a user input device of the access terminal.

41. The apparatus of claim 38, wherein the election is based on a decision to access a resource from a local network to which the access point is connected.

42. A computer-program product, comprising:
a non-transitory computer-readable medium comprising code for causing a computer to:
elect, at an access terminal, to operate in a first mode or a second mode, wherein in the first mode the access terminal is to be paged for unicast and non-unicast packets and in the second mode the access terminal is to be paged only for unicast packets, and wherein the election of the first mode or the second mode is based on whether an application has been initiated that requires access to a local service; and
send an indication of the election to a serving access point for the access terminal.

43. The computer-program product of claim 42, wherein the election is autonomously performed by an application executing on the access terminal.

44. The computer-program product of claim 42, wherein the election comprises receiving a signal from a user input device of the access terminal.

45. The computer-program product of claim 42, wherein the election is based on a decision to access a resource from a local network to which the access point is connected.

* * * * *